US012380804B2

(12) United States Patent
Ucar et al.

(10) Patent No.: US 12,380,804 B2
(45) Date of Patent: Aug. 5, 2025

(54) EXTENDING EV RANGE THROUGH CONNECTED VEHICLES

(71) Applicant: TOYOTA MOTOR ENGINEERING & MANUFACTURING NORTH AMERICA, INC., Plano, TX (US)

(72) Inventors: Seyhan Ucar, Mountain View, CA (US); Takamasa Higuchi, Mountain View, CA (US); Onur Altintas, Mountain View, CA (US); Kentaro Oguchi, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 207 days.

(21) Appl. No.: 18/185,551

(22) Filed: Mar. 17, 2023

(65) Prior Publication Data

US 2024/0312344 A1 Sep. 19, 2024

(51) Int. Cl.
*G08G 1/09* (2006.01)
*G08G 1/0967* (2006.01)

(52) U.S. Cl.
CPC .............................. *G08G 1/096725* (2013.01)

(58) Field of Classification Search
CPC ................................................ G08G 1/096725
See application file for complete search history.

(56) References Cited

U.S. PATENT DOCUMENTS 10,587,998 B2 3/2020 Altintas et al.
11,009,868 B2 5/2021 Ferguson et al.
11,036,370 B2 6/2021 Adenwala et al.
11,395,118 B2 7/2022 Higuchi et al.
2021/0056852 A1* 2/2021 Lund ...................... G08G 1/005
2021/0110708 A1 4/2021 Yang et al.
2022/0035365 A1 2/2022 Ucar et al.
2022/0058945 A1 2/2022 Higuchi et al.
2022/0070634 A1 3/2022 Ucar et al.
2022/0075365 A1 3/2022 Ucar et al.
2022/0297719 A1 9/2022 Mittal et al.
2023/0029093 A1 1/2023 Pedersen et al.
2024/0185714 A1* 6/2024 Jha ......................... G01C 21/34

FOREIGN PATENT DOCUMENTS

CN 115273500 A 11/2022
JP 2012238169 A * 12/2012
JP 2019191949 A * 10/2019
WO 2022223952 A1 10/2022

OTHER PUBLICATIONS

English translation of JP-2019191949-A (Year: 2019).*
English translation of JP-2012238169-A (Year: 2012).*

* cited by examiner

*Primary Examiner* — Navid Z. Mehdizadeh
*Assistant Examiner* — Matthew Ho

(57) ABSTRACT

An example operation includes one or more of directing a group of connected vehicles to occupy one or more lanes approaching an intersection and notifying one of the connected vehicles to exit the group using another of the one or more lanes prior to the intersection.

18 Claims, 27 Drawing Sheets

100

265

290

290A

290B

290D

290E

300

320

340

600

EXTENDING EV RANGE THROUGH CONNECTED VEHICLES

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer located on and/or off the transport.

SUMMARY

One example embodiment provides a method that includes one or more of directing a group of connected vehicles to occupy one or more lanes approaching an intersection and notifying one of the connected vehicles to exit the group using another of the one or more lanes prior to the intersection.

Another example embodiment provides a system that includes a memory communicably coupled to a processor, wherein the processor performs one or more of direct a group of connected vehicles to occupy one or more lanes that approach an intersection and notify one of the connected vehicles to exit the group using another of the one or more lanes prior to the intersection.

A further example embodiment provides a computer readable storage medium comprising instructions, that when read by a processor, cause the processor to perform one or more of directing a group of connected vehicles to occupy one or more lanes approaching an intersection and notifying one of the connected vehicles to exit the group using another of the one or more lanes prior to the intersection.

DETAILED DESCRIPTION

Figure 1A:
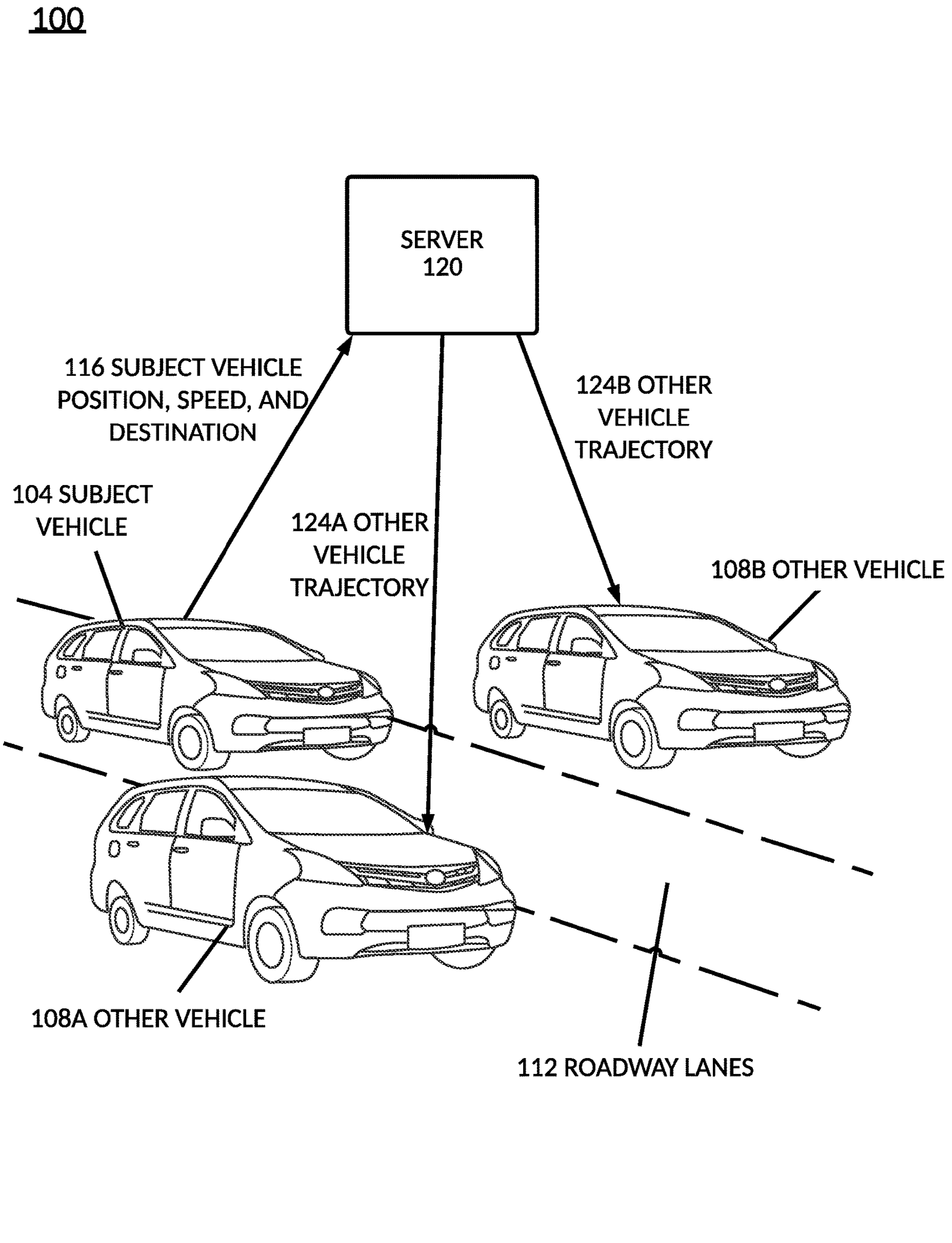
FIG. 1A illustrates an example of extending EV range through connected vehicles, according to example embodiments.

It will be readily understood that the instant components, as generally described and illustrated in the figures herein, may be arranged and designed in a wide variety of different configurations. Thus, the following detailed description of the embodiments of at least one of a method, apparatus, computer readable storage medium and system, as represented in the attached figures, is not intended to limit the scope of the application as claimed but is merely representative of selected embodiments. Multiple embodiments depicted herein are not intended to limit the scope of the solution. The computer-readable storage medium may be a non-transitory computer readable medium or a non-transitory computer readable storage medium.

Communications between the transport(s) and certain entities, such as remote servers, other transports, and local computing devices (e.g., smartphones, personal computers, transport-embedded computers, etc.) may be sent and/or received and processed by one or more 'components' which may be hardware, firmware, software or a combination thereof. The components may be part of any of these entities or computing devices or certain other computing devices. In one example, consensus decisions related to blockchain transactions may be performed by one or more computing devices or components (which may be any element described and/or depicted herein) associated with the transport(s) and one or more of the components outside or at a remote location from the transport(s).

The instant features, structures, or characteristics described in this specification may be combined in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one example. Thus, appearances of the phrases "example embodiments", "in some embodiments", "in other embodiments," or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication, even if the depicted connection is a one-way or two-way arrow. In the current solution, a vehicle or transport may include one or more of cars, trucks, walking area battery electric vehicle (BEV), e-Palette, fuel cell bus, motorcycles, scooters, bicycles, boats, recreational vehicles, planes, and any object that may be used to transport people and or goods from one location to another.

In addition, while the term "message" may have been used in the description of embodiments, other types of network data, such as, a packet, frame, datagram, etc. may also be used. Furthermore, while certain types of messages and signaling may be depicted in exemplary embodiments they are not limited to a certain type of message and signaling.

Example embodiments provide methods, systems, components, non-transitory computer readable medium, devices, and/or networks, which provide at least one of a transport (also referred to as a vehicle or car, herein), a data collection system, a data monitoring system, a verification system, an authorization system, and a vehicle data distribution system. The vehicle status condition data received in the form of communication messages, such as wireless data network communications and/or wired communication messages, may be processed to identify vehicle/transport status conditions and provide feedback on the condition and/or changes of a transport. In one example, a user profile may be applied to a particular transport/vehicle to authorize a current vehicle event, service stops at service stations, to authorize subsequent vehicle rental services, and enable vehicle-to-vehicle communications.

Within the communication infrastructure, a decentralized database is a distributed storage system which includes multiple nodes that communicate with each other. A blockchain is an example of a decentralized database, which includes an append-only immutable data structure (i.e., a distributed ledger) capable of maintaining records between untrusted parties. The untrusted parties are referred to herein as peers, nodes, or peer nodes. Each peer maintains a copy of the database records, and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In public or permissionless blockchains, anyone can participate without a specific identity. Public blockchains can involve cryptocurrencies and use consensus-based on various protocols such as proof of work (PoW). Conversely, a permissioned blockchain database can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications which leverage tamper-proof properties of the shared or distributed ledger (which may be in the form of a blockchain) and an underlying agreement between member nodes, which is referred to as an endorsement or endorsement policy. In general, blockchain entries are "endorsed" before being committed to the blockchain while entries, which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol produces an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry proposals to an ordering service (e.g., ordering node). Another type of node is a peer node, which can receive client submitted entries, commit the entries and maintain a state and a copy of the ledger of blockchain entries. Peers can also have the role of an endorser. An ordering-service-node or orderer is a node running the communication service for all nodes and which implements a delivery guarantee, such as a broadcast to each of the peer nodes in the system when committing entries and modifying a world state of the blockchain. The world state can constitute the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which stores an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries where N is equal to or greater than one. The block header includes a hash of the blocks' entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Since the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log and can therefore be regenerated from the chain at any time. The state database may automatically be recovered (or generated if needed) upon peer node startup and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a service to a particular vehicle and/or a user profile that is applied to the vehicle. For example, a user may be the owner of a vehicle or the operator of a vehicle owned by another party. The vehicle may require service at certain intervals, and the service needs may require authorization before permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more vehicle and/or road sensors or cameras, which report sensed data to a central controller computer device in and/or apart from the vehicle. This data is forwarded to a management server for review and action. A sensor may be located on one or more of the interior of the transport, the exterior of the transport, on a fixed object apart from the transport, and on another transport proximate the transport. The sensor may also be associated with the transport's speed, the transport's braking, the transport's acceleration, fuel levels, service needs, the gear-shifting of the transport, the transport's steering, and the like. A sensor, as described herein, may also be a device, such as a wireless device in and/or proximate to the transport. Also, sensor information may be used to identify whether the vehicle is operating safely and whether an occupant has engaged in any unexpected vehicle conditions, such as during a vehicle access and/or utilization period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., owner, user, company, agency, etc.) may want to limit the exposure of private information, and therefore the blockchain and its immutability can be used to manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a consensus approach associated with the blockchain. Such an approach could not be implemented on a traditional centralized database.

Various driving systems of the instant solution can utilize software, an array of sensors as well as machine learning functionality, light detection and ranging (Lidar) projectors, radar, ultrasonic sensors, etc. to create a map of terrain and road that a transport can use for navigation and other purposes. In some embodiments, GPS, maps, cameras, sensors and the like can also be used in autonomous vehicles in place of Lidar.

The instant solution includes, in certain embodiments, authorizing a vehicle for service via an automated and quick authentication scheme. For example, driving up to a charging station or fuel pump may be performed by a vehicle operator or an autonomous transport and the authorization to receive charge or fuel may be performed without any delays provided the authorization is received by the service and/or charging station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record. A blockchain may be used for storing transport-related data and transactions.

Any of the actions described herein may be performed by one or more processors (such as a microprocessor, a sensor, an Electronic Control Unit (ECU), a head unit, and the like), with or without memory, which may be located on-board the transport and/or or off-board the transport (such as a server, computer, mobile/wireless device, etc.). The one or more processors may communicate with other memory and/or other processors on-board or off-board other transports to utilize data being sent by and/or to the transport. The one or more processors and the other processors can send data, receive data, and utilize this data to perform one or more of the actions described or depicted herein.

FIG. 1A illustrates an example of extending an electric vehicle (EV) range through connected vehicles, according to example embodiments. A system 100 may include a subject vehicle 104, one or more other vehicles 108, and a server 120. In one embodiment, the system 100 may include a subject vehicle 104 and other vehicles 108A and 108B. In another embodiment, the system 100 may include the subject vehicle 104 and any number of other vehicles 108. The subject vehicle 104 and other vehicles 108 may include cars, trucks, recreational vehicles, construction vehicles, motorcycles, mopeds, powered bicycles, trains, aircraft, and the like. In one embodiment, the subject vehicle 104 and other vehicles 108 herein may be at least partially powered by electric energy (i.e., hybrid vehicles (PHEVs) or EVs, etc.). Subject vehicles 104 and other vehicles 108 may be used to transport one or more occupants and/or cargo items, and one or more occupants may be associated with the subject vehicle 104 and/or other vehicles 108. For example, subject vehicle 104 may include a driver, as described herein. Occupants may have occupant devices such as smartphones, smartwatches, and the like. In one embodiment, other vehicles 108 may have similar or different features and capabilities as the subject vehicle 104. For example, the subject vehicle 104 and/or the other vehicles 108 may each be self-driving vehicles or may have a driver.

The server 120 may include one or more processors and memory devices for storing applications and data. In one embodiment, the server 120 may be associated with a vehicle manufacturer, a town or municipality, a government entity, a business or group of businesses, an organization, and the like. In one embodiment, server 120 and/or the logic of the instant solution, may be located in a network or cloud, may be part of the subject vehicle 104 and/or other vehicles 108, and/or in or connected to one or more subject vehicles 104 or other devices, such as vehicle charging stations. In one embodiment, the server 120 may represent any number of computing devices that may determine results and share data and determined results. The server 120 may communicate with the subject vehicle 104 and one or more other vehicles 108 in order to provide and/or obtain various information, as described herein.

In one embodiment, a subject vehicle 104 may include an emergency vehicle such as an ambulance, a fire truck, a police car, and the like. In another embodiment, the subject vehicle 104 may be a vehicle having a higher transportation priority than other vehicles 108, such as a vehicle transporting an important individual or group of individuals, (e.g., a head of state, etc.), a vehicle associated with road construction, road maintenance, a public utility, and the like. In another embodiment, the subject vehicle 104 may be a vehicle associated with an average individual but requesting/requiring a higher travel priority than other vehicles 108. For example, a driver of a vehicle may request to be considered a subject vehicle 104 if the driver or another vehicle occupant is having a medical emergency, such as in the process of giving birth, and the like.

In one embodiment, the subject vehicle 104 may be traveling on a roadway in a similar direction as one or more other vehicles 108. Other vehicles 108 may be driving in a same or a different lane 112 of a roadway and in front of or behind the subject vehicle 104. In some embodiments, the roadway may have multiple lanes 112, and other vehicles 108 may be in lanes 112 to the left or right of the subject vehicle 104, as well as in front of, parallel with, or behind the subject vehicle 104.

In one embodiment, a navigation processor of the subject vehicle 104 and/or the other vehicles 108 may be managing the driving of the vehicle on a route to a destination. The route may include one or more turns and merges with any other roadways. The navigation processor may transmit turn instructions to one or more other processors of the subject vehicle 104. In one embodiment, the subject vehicle 104 and/or one or more of the other vehicles 108 may be an autonomous or self-driving vehicle controlled by commands from the navigation processor or another processor.

The subject vehicle 104 and other vehicles 108 may be driving at similar or different speeds, accelerating, decelerating, or stopping. In one embodiment, the subject vehicle 104 may transmit a position, speed, and destination 116 to a server 120. In one embodiment, one or more of the other vehicles 108 may also transmit a position, speed, and destination to the server 120. The server 120 may include one or more software applications that manage traffic flow involving the subject vehicle 104 and the other vehicles 108. For example, an application may provide travel priority to the subject vehicle 104 over other vehicles 108 to maximize energy efficiency and operating range of the subject vehicle 104. The application may analyze the subject vehicle position, speed, and destination 116 compared to similar data from the other vehicles 108 in order to maximize the operating range of the subject vehicle 104, as described herein. As a result of the analysis, the server 120 may transmit other vehicle trajectories to the other vehicles 108, such as other vehicle trajectory 124A to other vehicle 108A and other vehicle trajectory 124B to other vehicle 108B.

Other vehicle trajectories 124 may include directions to the other vehicles 108 to change speed, change lanes 112, and/or exit the roadway. The objective is to attempt to keep other vehicles 108 out of the way of the subject vehicle 104 in order to not cause the subject vehicle 104 to stop, slow down, or accelerate more than minimally necessary. In order to manage traffic in proximity to the subject vehicle 104, the server 120 may establish a group of connected vehicles, which may be referred to as a Vehicular Micro Cloud, and possibly other groups of connected vehicles further away from the subject vehicle 104.

Similar to mobile edge computing in 5G networks, Vehicular Micro Clouds rely on the communication capabilities of vehicles forming virtual cloud servers, to communicate with each other, process data, and send results back to the server 120, or otherwise referred to centralized cloud data centers. These Vehicular Micro Clouds may be organized into two models, Stationary Micro Clouds, and Mobile Micro Clouds. Stationary Micro Clouds are an approach that anchors the cloud to a geographic region, in which cars join the Micro Cloud based on a need determined by the instant solution and hand off data and tasks when the need no longer exists. A Mobile Micro Cloud is an approach that features an ad-hoc formation. One vehicle serves as a "Micro Cloud Leader," recruiting micro cloud members and distributing sub-tasks for collaborative task execution. The Micro Cloud moves along roads with the motion of the Micro Cloud Leader.

Through the use of Vehicular Micro Clouds, the instant solution allows the maneuvering of vehicles in such a way as to minimize actions that cause additional energy to be consumed. This may help a subject vehicle 104 to maintain energy capacity and adhere to a determined amount of range to empty.

The server 120 may add or subtract specific vehicles 104, 108 to/from groups of connected vehicles based on varying speeds between vehicles, location/position of other vehicles 108, density of traffic, spacing or gaps between vehicles, and the like. In one embodiment, the server 120 may monitor other vehicles 108 that are ahead of the subject vehicle 104 more closely than other vehicles 108 that are behind the subject vehicle 104. The reason for that is other vehicles 108 that are ahead of the subject vehicle 104 may cause the subject vehicle 104 to stop, slow down, or speed up while other vehicles 108 that are behind the subject vehicle 104 may not.

In one embodiment, a server 120 application may attempt to maintain a minimum gap ahead of and/or to the sides of the subject vehicle 104 in order to provide a buffer from traffic and allow space for maneuver of other vehicles 108 to other lanes 112 of the roadway or off the roadway. For example, while navigating a route to a destination, there may be a break in traffic to a side of the subject vehicle 104 that allows the subject vehicle 104 to change lanes 112 and turn or exit the roadway via an off-ramp, a left turn, or a right turn toward the destination. In another embodiment, it may be advantageous for the server 120 to guide other vehicles 108 to get around slower traffic ahead in the same lane 112 or avoid roadway debris or a traffic accident.

In one embodiment, the subject vehicle 104 may continuously gather various information and data related to conditions proximate to the subject vehicle 104. The proximity may include a distance away from the subject vehicle 104 based on speed of traffic, density of traffic, and/or a speed of the subject vehicle 104. In one embodiment, the proximity distance may be related to an expected speed differential between the subject vehicle 104 and the other vehicles 108 as well as the current speed of the subject vehicle 104 and the other vehicles 108. Greater speeds or speed differentials may require greater distances to determine which other vehicles 108 are proximate the subject vehicle 104. Over time, some other vehicles 108 may leave the proximity distance from the subject vehicle 104 while different other vehicles 108 may enter the proximity distance from the subject vehicle 104. The size and number of vehicles in the group of connected vehicles may depend on proximity to the subject vehicle 104, speed differentials between the subject vehicle 104 and the other vehicles 108, traffic density, a maximum group size, and the like.

In one embodiment, the gathered information may include one or more images of other vehicles 108 proximate the subject vehicle 104. For example, the subject vehicle 104 may include one or more external cameras and sensors (e.g., RADAR, LIDAR, etc.) that detects the presence of other vehicles 108, distance to the other vehicles 108, identification of the other vehicles 108, and which other vehicles 108 are in a same or different lanes 112 of the roadway. For example, the subject vehicle 104 may include one or more external cameras to capture images of areas in front of, behind, to the left of, and to the right of the subject vehicle 104. The subject vehicle 104 may capture images from one or more external cameras, determine which (if any) other vehicles 108 in the captured images are proximate the subject vehicle 104, and temporarily store the captured images in a memory device associated with the subject vehicle 104.

In one embodiment, one or more traffic cameras associated with a roadway intersection may provide traffic images with time stamps to the server 120. The images may be provided at fixed or variable intervals, such as every 15 or 30 seconds. The images may show all lanes of a roadway, including vehicles or objects in each lane, traffic density, traffic accidents, and the like. The one or more traffic cameras may transmit the captured images to the server 120. The server 120 may execute one or more software applications stored in an accessible memory device to analyze the traffic in each direction and lane and determine which lanes allow slower or faster vehicle movement.

One or more traffic cameras at the intersection may capture license plate numbers for each vehicle at the intersection and provide the captured license plate numbers with a facing of the corresponding camera (e.g., facing West) and a time stamp the image was captured, to the server 120. The server 120 may match up license plate images with camera images having a same time stamp. A software application executed the server 120 may read license plate numbers and match with vehicle contact information stored in an accessible memory device or database. The server 120 may contact vehicles matching license plate numbers to provide specific movement or positioning instructions. For example, the server 120 may determine the right two westbound lanes of a three lane roadway and moving very slowly and/or stopped, but the left lane is moving well. If the subject vehicle 104 is in the center lane, the server 120 may transmit a notification to the subject vehicle 104 to change lanes to the left lane and drive forward through the intersection.

In one embodiment, another vehicle 108 may be proximate to the subject vehicle 104 based on received sensor data from the subject vehicle 104. For example, the subject vehicle 104 may include RADAR or LIDAR sensors that may provide data to processors associated with the subject vehicle 104 to measure distances to nearby objects, including other vehicles 108. The processor may determine that some other vehicles 108 are proximate while different other vehicles 108 are not proximate, due to distance data from the sensor(s), speed of the subject vehicle 104, and speeds of the other vehicles 108. In one embodiment, the processor associated with the subject vehicle 104 may save the images and sensor data that corresponds to proximate other vehicles 108 and discard the images and sensor data that include no proximate other vehicles 108. For example, a given image may include two other vehicles 108. Sensor data for the two other vehicles 108 may result in the processor associated with the subject vehicle 104 determining the one other vehicle 108 is proximate while a second other vehicle 108 (e.g., further away) is not proximate the subject vehicle 104. Therefore, the processor associated with the subject vehicle 104 may save the image and the sensor data for the proximate other vehicle 108 to an accessible memory device.

Figure 1B:
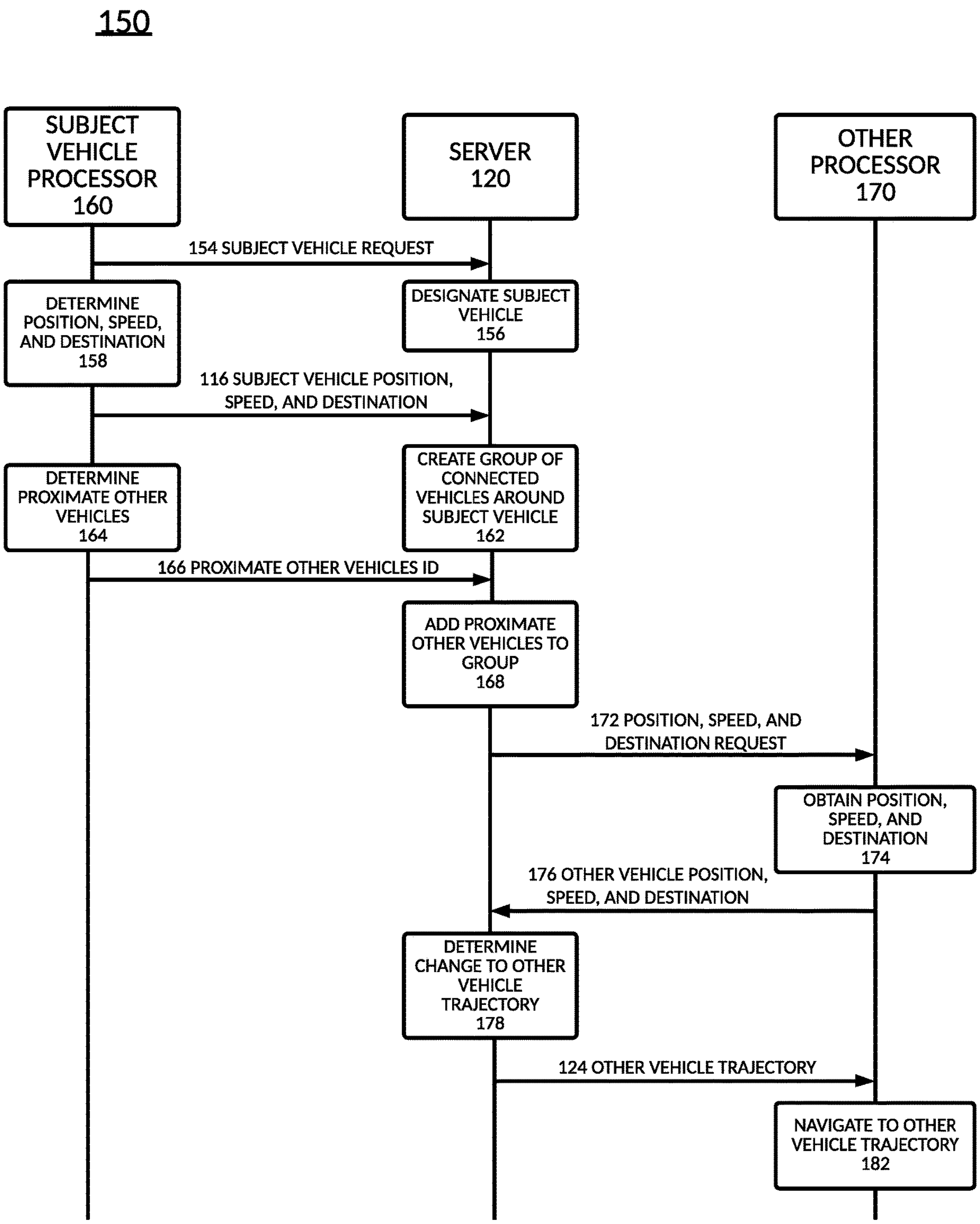
FIG. 1B illustrates a further example of extending EV range through connected vehicles, according to example embodiments.

FIG. 1B illustrates a further example of extending EV range through connected vehicles, according to example embodiments. A system 150 may include a subject vehicle processor 160, the server 120, and another processor 170. The server 120 was previously described with respect to FIG. 1A. The subject vehicle 104 may include a subject vehicle processor 160 that communicates with the server 120 and the other processor 170. The other vehicle 108 may include another processor 170, in the form of another vehicle processor 170, that communicates with the server 120 and the subject vehicle processor 160. The other processor 170 may also include a processor associated with a traffic signal that communicates traffic signal timing to the server 120, as described herein. The subject vehicle processor 160 and/or the other processor 170 may include a navigation processor, a communication processor, a head unit processor, an ECU processor, a sensor processor, and the like. The subject vehicle processor 160, the server 120, and the other processor 170 may communicate over wireless communication media. For example, the subject vehicle 104 and/or the other vehicle 108 may be traveling, and may communicate wirelessly with the server 120, such as via Wi-Fi, Bluetooth, other wireless communication interfaces, and the like.

In one embodiment, the subject vehicle processor 160 may capture external images and data. In one embodiment, the external images may include camera images from one or more external cameras of the subject vehicle 104. The data may include sensor data from RADAR and/or LIDAR devices to establish distances to and speeds of proximate other vehicles 108. In another embodiment, the external images may include camera images and data from the other vehicle processor 170 of another vehicle 108. For example, the subject vehicle 104 may only have a front camera and/or a back camera available, and may obtain camera images and data from a side-facing camera of another vehicle 108. The subject vehicle processor 160 may transmit a request to the server 120 to have the other vehicle processor 170 capture external images and data and transmit the external images and data to the subject vehicle processor 160. From previously received external camera images from the subject vehicle processor 160, the server 120 may determine a license plate number for the other vehicle 108 and contact the other vehicle processor 170 to provide the requested images. The server 120 may store in an accessible memory device a data structure containing license numbers and wireless contact information for other vehicles 108 that may be directly contacted (e.g., the subject vehicle 104 and other vehicles 108 may be owned by a large business, such as a package delivery service or taxi service).

In one embodiment, the subject vehicle processor 160 may transmit a subject vehicle request 154 to the server 120. The subject vehicle request 154 may include one or more of a VIN, license plate number and/or physical description of the subject vehicle 104, a time of the request 154, a requested duration to be considered a subject vehicle 104, a reason for the request (e.g., emergency vehicle responding to or participating in an emergency, a medical or safety emergency associated with an occupant of the subject vehicle 104, or another reason). In one embodiment, the server 120 may review the subject vehicle request 154 and determine if the request should be granted. For example, the server 120 may have a data structure stored in an accessible memory device that includes identifying information for emergency vehicles within a city or other municipality. If the identifying information for the emergency vehicle matches the stored identifying information, the server 120 may grant the subject vehicle request 154 by designating the subject vehicle 156. If the identifying information for the emergency vehicle does not match stored identifying information, the server 120 may not grant the subject vehicle request 154. In one embodiment, the server 120 may transmit a notification to the subject vehicle processor 160, including the determination.

In one embodiment, the server 120 may designate a vehicle as a subject vehicle 104 for a period of time. For example, based on a subject vehicle position and speed 116, the server 120 may determine a non-emergency vehicle should be designated as a subject vehicle 104 for 30 minutes if it takes 20 minutes to reach a closest hospital. In another embodiment, the server 120 may designate a vehicle as a subject vehicle 104 until a time when the GPS coordinates of the subject vehicle 104 (i.e., position 116) match GPS coordinates of either a destination of the subject vehicle 104 or a hospital in the case of a medical emergency.

In one embodiment, the subject vehicle processor 160 may determine the position, speed, and destination of the subject vehicle 104. In one embodiment, the subject vehicle processor 160 may also determine the position, and speed of one or more other vehicles 108. The subject vehicle processor 160 may determine the position of the subject vehicle 104 by obtaining GPS coordinates from a GPS receiver of the subject vehicle 104. The subject vehicle processor 160 may obtain the speed from an ECU and the destination from a navigation processor of the subject vehicle 104. In one embodiment, the subject vehicle processor 160 may obtain the position and speed at regular intervals, such as every minute or every 10 seconds. The subject vehicle processor 160 transmits the subject vehicle position, speed, and destination 116 to the server 120.

In response to receiving the subject vehicle position, speed, and destination 116, the server 120 creates a group of connected vehicles around the subject vehicle 162. In one embodiment, the group of connected vehicles may include other vehicles 108 within a proximity or distance from the subject vehicle 104. The distance may be based on the speed of the subject vehicle 104. For example, if the subject vehicle 104 has a current speed of 60 miles per hour, the group of connected vehicles may include other vehicles 108 within 80 feet of the subject vehicle 104. In one embodiment, the subject vehicle processor 160 may determine proximate other vehicles 164 by wirelessly broadcasting a request to proximate other vehicles 108 to respond with GPS coordinates, VIN, license plate number, and/or contact information (e.g., IP address, Bluetooth address, and the like). The subject vehicle processor 160 may periodically gather received data from responding other vehicle processors 170 and provide the received data as proximate other vehicles ID 166 to the server 120. The server 120 may add the proximate other vehicles to the group of connected vehicles 168, based on the received proximate other vehicles ID 166. For example, the subject vehicle 104 may determine and report to the server 120 ten proximate other vehicles 108 within 5, 8, 15, 30, 32, 48, 59, 70, 78, and 85 feet. The server 120 may determine the group of connected vehicles includes other vehicles 108 within 80 feet of the subject vehicle 104. Therefore, the server 120 may include the other vehicles 108 within 5, 8, 15, 30, 32, 48, 59, 70, and 78 feet of the subject vehicle 104 in the group of connected vehicles, but exclude the other vehicle 108 at 85 feet.

In one embodiment, the server 120 may assign other vehicles 108 that are not proximate to one or more other groups of connected vehicles. For example, from the previous example, the server 120 may include the other vehicle 108 at 85 feet distance to another group of connected vehicles, possibly including other vehicles 108 ahead of the subject vehicle 104 and having a current position between 80-160 feet from the subject vehicle 104.

In one embodiment, the server 120 may normally maintain a group within a proximity distance of the subject vehicle 104. However, in some cases, traffic around the subject vehicle 104 may be sparse at the current time (i.e., low traffic density). For example, the server 120 may receive position and speed notifications that reflect only five other vehicles 108 within 100 feet of the subject vehicle 104. If one of the other vehicles 108 in the group has a higher speed and moves 150 feet ahead of the group, the server 120 may determine the faster other vehicle 108 stays in the group even though it may move outside of a proximity distance to the subject vehicle 104.

In one embodiment, the server 120 may transmit a position, speed, and destination request 172 to the other vehicle processors 170 of the proximate other vehicles 108. The other vehicle processors 170 may obtain the position, speed, and destination for each of the corresponding other vehicles 174 and provide the position, speed, and destination 176 to the server 120. For example, the other vehicle processors 170 may obtain the speed from an ECU, the position from a GPS receiver, and the destination from a navigation processor, similar to the subject vehicle processor 160.

In another embodiment, the server 120 may manage groups to have a maximum number of included vehicles. For example, a maximum size of any group of connected vehicles may be eight total vehicles (i.e. and combination of the subject vehicle 104 and other vehicles 108). Another vehicle 108 may leave a group by turning off the roadway the subject vehicle 104 is on or by the server 120 removing the other vehicle 108 from a group. For example a full group of eight vehicles may become a group of seven vehicles by a vehicle leaving the group. In this embodiment, the server 120 may add another vehicle 108 to the group when the server 120 receives a subject vehicle position, speed, and destination notification 116 from the subject vehicle processor 160 (which may include position and speed of other vehicles 108, as discussed herein) or another vehicle position, speed, and destination 176 from the other vehicle 108.

In one embodiment, the server 120 may determine a change to one or more other vehicle trajectories 178 based on a comparison between the subject vehicle position, speed, and destination 116 and the received other vehicle position, speed, and destination 176 from the other vehicle processors 170. Other vehicle trajectories 178 may include a speed, a position relative to the subject vehicle (e.g., move to a lane 112 to the right of and behind the subject vehicle 104, remain in the current lane 112 but increase speed to 50 mph, etc.), or an exit from a roadway where the subject vehicle 104 is traveling. The server 120 may compare each of the proximate other vehicles 108 to the subject vehicle 104 to understand how the subject vehicle 104 may be impacted and to reduce or eliminate that impact. For example, a destination of a proximate other vehicle 108 may require a lane change that may negatively impact the subject vehicle 104 if the lane change occurs in front of the subject vehicle 104. Therefore, the server 120 may determine a change in trajectory 178 to the other vehicle includes reducing speed to a speed lower than the subject vehicle 104, waiting until the subject vehicle 104 passes the other vehicle 108, and then requesting the other vehicle 108 to change to a lane 112 that allows travel to the other vehicle's destination. After determining any changes to other vehicle trajectories 178, the server 120 transmits new other vehicle trajectories 124 to affected other vehicles 108. Proximate other vehicles 108 may not receive a new other vehicle trajectory 124 from the server 120 if the server 120 determines the proximate other vehicles 108 are not likely to cause a change of speed, lane 112, or stop by the subject vehicle 104. Other vehicle processors 170 that receive a new other vehicle trajectory 124 from the server 120 may navigate to the new other vehicle trajectory 182. In one embodiment, the server 120 may continuously perform the described calculations as long as the subject vehicle 104 is active. For example, after transporting a medical patient to a hospital, a subject vehicle processor 160 of an ambulance may transmit a subject vehicle request 154 to the server to remove the ambulance from being a designated subject vehicle 104.

In one embodiment, the server 120 may include information in the other vehicle trajectory 124 that indicates an ID number of the group the other vehicle 108 is currently in or moving into. For example, the server 120 may include information in the other vehicle trajectory 124 that notifies another vehicle 108 to slow down to a designated speed and stay within the current group. In another embodiment, other vehicles 108 may not need to know which group it is in or transitioning to and only the other vehicle trajectory 124 may be needed.

In one embodiment, the subject vehicle 104 and/or other vehicle 108 may receive vehicle trajectory 124 and display the vehicle trajectory 124 on a vehicle display (e.g., head unit display) and/or one or more occupant devices (e.g., smartphone, smartwatch, etc.) associated with vehicle occupant(s). A driver of the vehicle may alter vehicle functionality based on the vehicle trajectory 124. If the subject vehicle 104 or other vehicle 108 is an autonomous vehicle, the received vehicle trajectory 124 may modify vehicle functionality related to a speed or direction change, a lane change, and the like.

In one embodiment, either the subject vehicle 104 and/or another vehicle 108 may remain in a current group while increasing speed and/or accelerating as long as the higher speed is appropriate for the road being traveled. For example, the server 120 may maintain a data structure in an accessible memory device that includes appropriate speeds for a roadway, based on GPS coordinates. The server 120 receives position and speed updates 116, 176 from the subject vehicle 104 and other vehicles 108, respectively, and compares the positions and speeds to the data structure. As long as the speeds of the other vehicles 108 are appropriate for the roadway the other vehicles are traveling on, the server 120 may maintain other vehicles 108 in the current group. However, if other vehicles are exceeding appropriate speeds for more than a time period (e.g., 30 seconds), the server 120 may migrate other vehicles 108 to a different group than the subject vehicle 104.

In one embodiment, two or more groups of connected vehicles may be combined or merged if the groups exhibit similar characteristics and can safely integrate into different lanes 112 of a roadway. Similar characteristics may mean vehicles of the groups are traveling in a same direction, have a same or similar destination, are traveling at similar speeds (e.g., within 5 MPh of each other), etc. In one embodiment, the server 120 may determine traffic densities based on the position updates for vehicles within each group and only combine groups having similar characteristics if a traffic density threshold is not exceeded. For example, the server 120 may store a maximum traffic density of 10 vehicles per 150 feet of roadway in an accessible memory device. The server 120 may determine a first group has a density of 7 vehicles per 150 feet and an adjacent second group has a density of 8 vehicles per 150 feet. Even though each group individually is less than 10 vehicles per 150 feet, the combination of the two groups may result in a combined density over 10 vehicles per 150 feet. Therefore, the server 120 may not combine the groups.

In one embodiment, the server 120 may designate a vehicle of the group of connected vehicles as a subject vehicle 104 and direct one or more of the other vehicles 108 ahead of the subject vehicle 104 to occupy a different lane 112 than a lane 112, including the subject vehicle 104. As described herein, a vehicle may request 154 to become a subject vehicle 104. The server 120 may designate the vehicle as a subject vehicle 104 and build a group of connected vehicles around the subject vehicle 104. An objective of the group is to manage movement (i.e., position and speed) of other vehicles 108 in the group in order to not affect a speed and trajectory of the subject vehicle 104. This may mean that managing traffic ahead of the subject vehicle 104 is most important, and especially traffic in a same lane 112 as the subject vehicle 104. In one embodiment, another vehicle 108 ahead of the subject vehicle 104 and in a same lane 112 may be slowing with respect to the subject vehicle 104, reducing a gap between vehicles and potentially forcing the subject vehicle 104 to slow down or change lanes 112. In order to prevent that, the server 120 may direct the other vehicle 108 to change lanes 112 such that it will be in a different lane 112 of the roadway and less likely to cause the subject vehicle 104 to slow down or stop.

In one embodiment, the server 120 may determine the one of the connected vehicles is ahead of, in a same lane 112 as, and traveling at a slower speed than a subject vehicle 104 of the group and notify the one of the connected vehicles to exit the group. The one of the connected vehicles may be a vehicle with a reduced maximum speed and not able to keep up with a speed of proximate group that includes the subject vehicle 104. For example, the one of the connected vehicles may include a truck and trailer transporting a mobile home, a large boat, or heavy construction equipment, a heavily encumbered tractor trailer, a tow truck and passenger vehicle, a recreation vehicle, and the like.

In one embodiment, the other vehicle position, speed, and destination 176 may include data that identifies the other vehicle 108 as a slow-moving vehicle that will not be able to stay with the group it is currently assigned to. The server 120 may determine that slow-moving vehicles must exit the group. Exiting may mean leaving the roadway the subject vehicle 104 is traveling on, pulling off the roadway to a shoulder of the roadway, changing to a lane 112 designated for slow-moving vehicles, or dropping back to join a group traveling behind the subject vehicle 104. For example, exiting the group may include the server 120 assigning the one of the connected vehicles to a different group of connected vehicles than the group of connected vehicles that includes the subject vehicle 104.

In one embodiment, the server 120 may determine a destination for each vehicle of the group and notify each vehicle of the group to occupy a lane of the one or more lanes 112 and a speed of each vehicle to maintain as each vehicle travels to the destination. This may be of the greatest value right after a group is formed in order to limit or eliminate the number of trajectory changes 178 made by the server 120. The server 120 receives a destination of the subject vehicle 104 (and possibly one or more other vehicles 108) in the subject vehicle position, speed, and destination 116 and from other vehicle position, speed, and destination 176. For example, some vehicles 104, 108 may exit the roadway by a left turn while other vehicles 104, 108 may exit the roadway by a right turn or may reach their destination by staying on the roadway. In one embodiment, the server 120 may determine an optimal lane of a multi-lane roadway 112 for each vehicle of the group, based on destination. The server 120 may transmit other vehicle trajectories 124 to each other vehicle 108 of the group, and possibly to the subject vehicle 104 in order to position each vehicle in a lane 112 it is most likely to need to be in, relative to its destination. In one embodiment, the other vehicle trajectories 124 may include a speed for each vehicle of the group to maintain in order to preserve gaps between vehicles of the group and minimize the number of lane changes within the group.

In one embodiment, the server 120 may determine one or more vehicles of the group are traveling at a higher speed than other vehicles of the group and are more than a distance away from a subject vehicle 104 of the group and assign the one or more vehicles to a different group of connected vehicles. The server 120 may receive updates from the subject vehicle 116 and the other vehicles 176 that include position and speed updates for each vehicle within the group. The updates 176 from the other vehicles 108 may indicate one or more other vehicles 108 of the group separating from the group and moving ahead of the subject vehicle 104. The server 120 may store a maximum distance value in an accessible memory device that indicates a maximum distance that other vehicles may be ahead of or behind the subject vehicle 104 and remain in the same group. From the received updates, the server 120 may determine a distance to each other vehicle 108 in the group and compare the determined distance to the stored maximum distance value. If the server 120 determines that one or more other vehicles 108 are a greater distance away from the subject vehicle 104 than the maximum distance value, the server 120 may remove the one or more other vehicles 108 from the group that includes the subject vehicle 104 and assign the one or more other vehicles 108 to a next group of connected vehicles ahead of the former group.

In one embodiment, the server 120 may determine a timing of a traffic signal at the intersection and notify a subject vehicle 104 of the group and any other vehicle 108 in a same lane 112 as and traveling at a slower speed than the subject vehicle 104, of a speed to maintain related to the timing. In one embodiment, traffic signals may be programmed to activate whatever color lights they support at designated durations and in a designated sequence. Traffic lights may have an associated processor in communication with the server 120 that reports traffic signal timing to the server 120. In one embodiment, the traffic signal may specify a change to a specific color in a specific period of time. For example, change to yellow in 20 seconds. The server 120 may receive position and speed updates of the subject vehicle 104 (and possibly one or more other vehicles 108) in the subject vehicle position, speed, and destination 116 and from other vehicle position, speed, and destination 176. Based on position, speed, and traffic signal timing, the server 120 may determine an optimal efficiency for the subject vehicle 104 to maintain speed without slowing down or stopping at the traffic signal. For example, another vehicle trajectory 124 sent to the subject vehicle 104 and the other vehicle 108 ahead of the subject vehicle 104 and in a same lane 112 as the subject vehicle 104 may request both vehicles to proceed at a constant speed of 35 MPh. By coordinating the subject vehicle 104 speed and affected other vehicle 108 speeds with the traffic signal timing, slowing and stopping the subject vehicle 104 may in some cases be reduced or eliminated.

In one embodiment, the server 120 may determine a distance between a subject vehicle 104 of the group and another vehicle 108 of the group ahead of the subject vehicle 104 and in a same lane 112, determine the distance may result in a speed reduction of the subject vehicle 104, and notify the other vehicle 108 to increase the distance from the subject vehicle 104. The server 120 may receive updates from the subject vehicle 116 and the other vehicles 176 that include position and speed updates for each vehicle within the group. For example, position updates 116, 176 may indicate a distance between the subject vehicle 104 and another vehicle 108 of the group is reducing. At some point, this may cause the subject vehicle 104 to slow down or stop. The server 120 may transmit another vehicle trajectory 124 to the other vehicle 108 requesting the other vehicle 108 to increase a distance to the subject vehicle 104. The other vehicle 108 may increase distance to the subject vehicle 104 by accelerating to a higher speed than the subject vehicle 104 and staying in a same lane 112, moving to a different lane 112, or turning off the roadway the subject vehicle 104 is traveling on. In one embodiment, the other vehicle trajectory 124 may include a specific instruction. For example, "accelerate to 45 miles per hour for the next half mile".

Although FIG. 1B illustrates the perspective of the server 120 designating the subject vehicle 156, creating the group of connected vehicles around the subject vehicle 162, adding proximate other vehicles to the group of connected vehicles 168, and determining a change to a new other vehicle trajectory 178, it should be understood that the various analysis steps may be performed by one or more subject vehicle processors 160 and/or other vehicle processors 170.

For example, the system 150 may not have a server 120 available, or access to the server 120 may be interrupted.

Flow diagrams depicted herein, such as FIG. 1A, FIG. 1B, FIG. 2C, FIG. 2D, FIG. 2E, FIG. 3A, FIG. 3B and FIG. 3C, are separate examples but may be the same or different embodiments. Any of the operations in one flow diagram could be adopted and shared with another flow diagram. No example operation is intended to limit the subject matter of any embodiment or corresponding claim.

It is important to note that all the flow diagrams and corresponding processes derived from FIGS. 1A, 1B, 2C, 2D, 2E, 3A, 3B, and 3C, may be part of a same process or may share sub-processes with one another thus making the diagrams combinable into a single preferred embodiment that does not require any one specific operation but which performs certain operations from one example process and from one or more additional processes. All the example processes are related to the same physical system and can be used separately or interchangeably.

The instant solution can be used in conjunction with one or more types of vehicles: battery electric vehicles, hybrid vehicles, fuel cell vehicles, internal combustion engine vehicles and/or vehicles utilizing renewable sources.

Figure 2A:
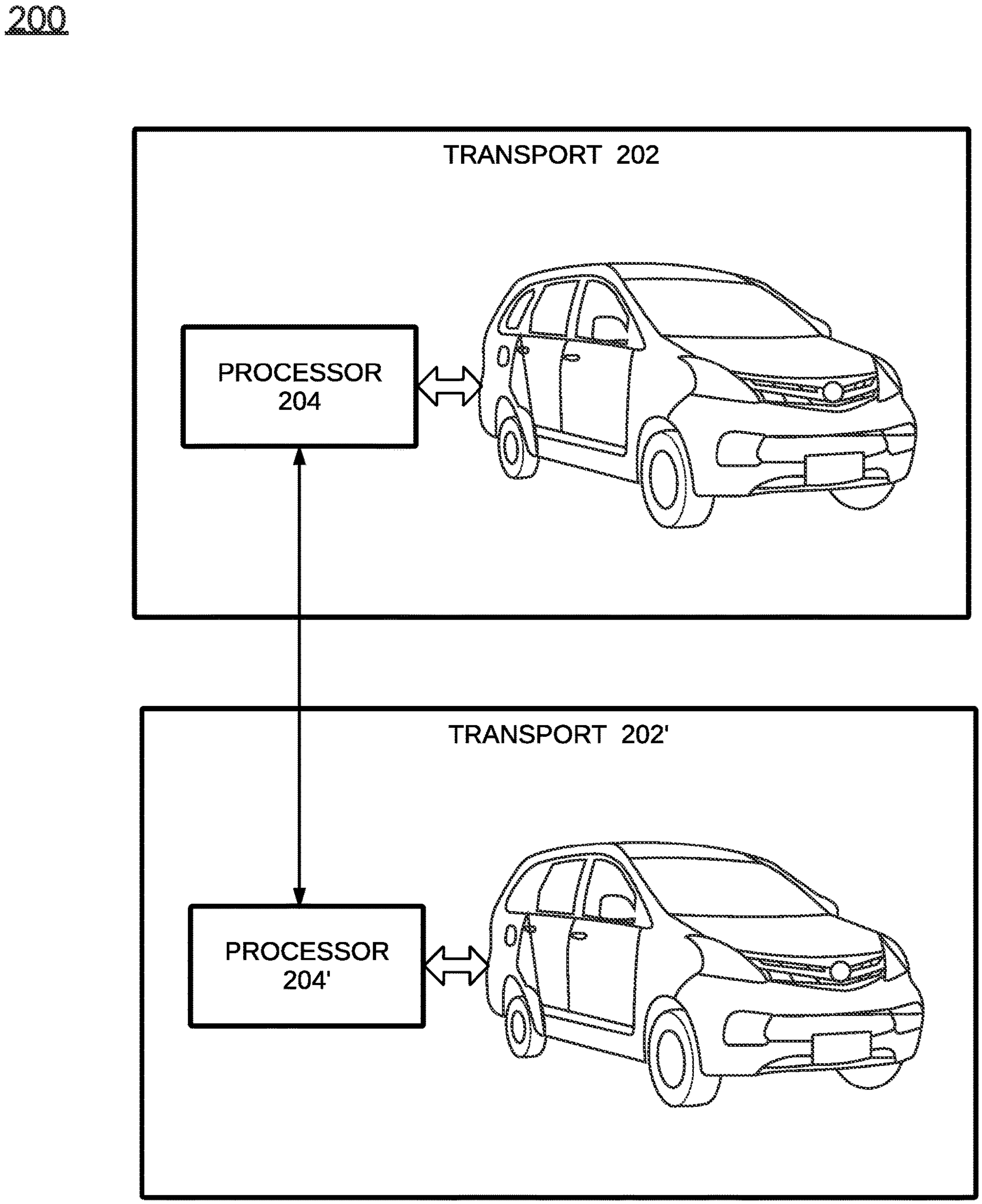
FIG. 2A illustrates a transport network diagram, according to example embodiments.

FIG. 2A illustrates a transport network diagram 200, according to example embodiments. The network comprises elements including a transport 202 including a processor 204, as well as a transport 202' including a processor 204'. The transports 202, 202' communicate with one another via the processors 204, 204', as well as other elements (not shown) including transceivers, transmitters, receivers, storage, sensors, and other elements capable of providing communication. The communication between the transports 202, and 202' can occur directly, via a private and/or a public network (not shown), or via other transports and elements comprising one or more of a processor, memory, and software. Although depicted as single transports and processors, a plurality of transports and processors may be present. One or more of the applications, features, steps, solutions, etc., described and/or depicted herein may be utilized and/or provided by the instant elements.

Figure 2B:
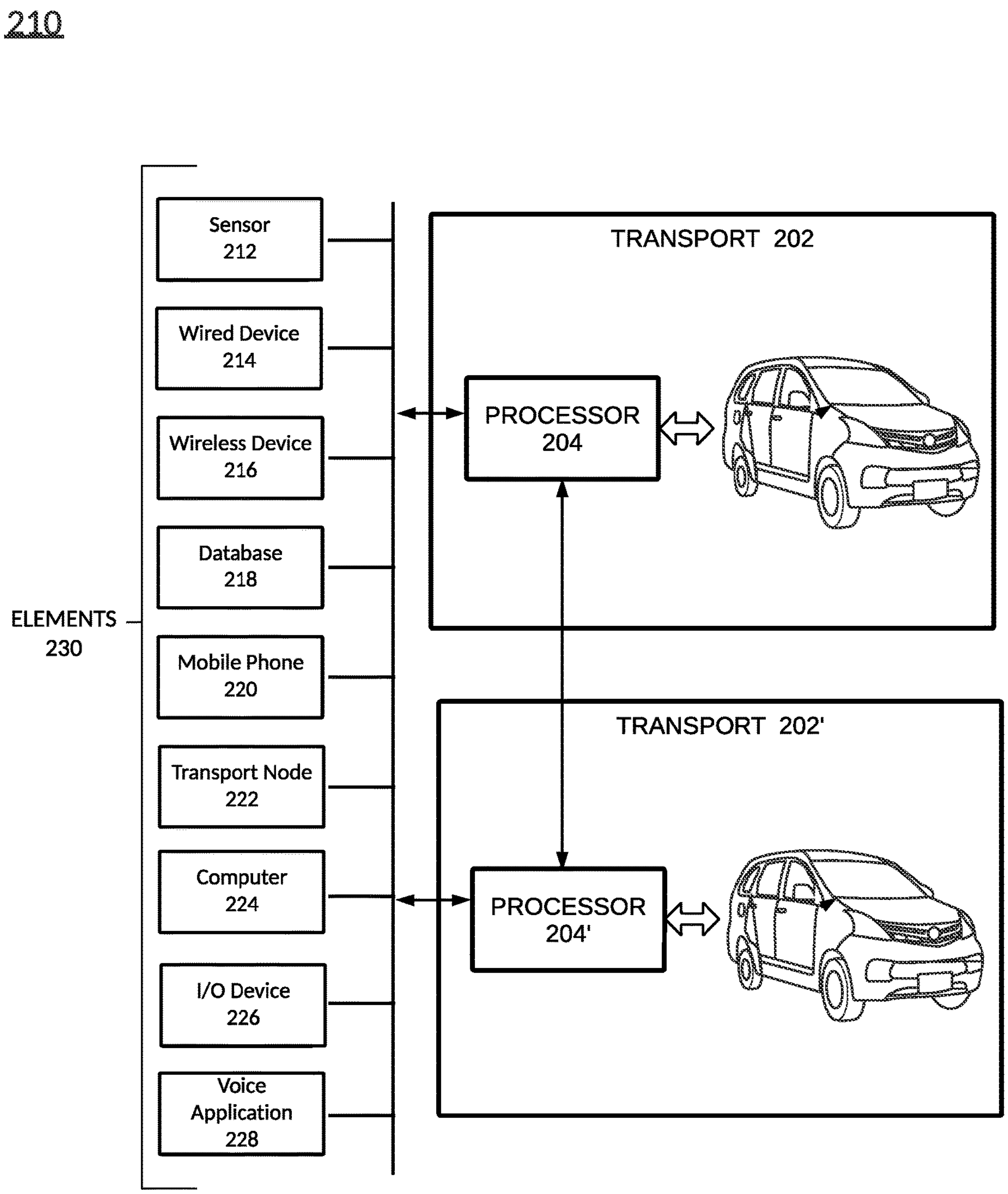
FIG. 2B illustrates another transport network diagram, according to example embodiments.

FIG. 2B illustrates another transport network diagram 210, according to example embodiments. The network comprises elements including a transport 202 including a processor 204, as well as a transport 202' including a processor 204'. The transports 202, 202' communicate with one another via the processors 204, 204', as well as other elements (not shown), including transceivers, transmitters, receivers, storage, sensors, and other elements capable of providing communication. The communication between the transports 202, and 202' can occur directly, via a private and/or a public network (not shown), or via other transports and elements comprising one or more of a processor, memory, and software. The processors 204, 204' can further communicate with one or more elements 230 including sensor 212, wired device 214, wireless device 216, database 218, mobile phone 220, transport 222, computer 224, I/O device 226, and voice application 228. The processors 204, 204' can further communicate with elements comprising one or more of a processor, memory, and software.

Although depicted as single transports, processors and elements, a plurality of transports, processors and elements may be present. Information or communication can occur to and/or from any of the processors 204, 204' and elements 230. For example, the mobile phone 220 may provide information to the processor 204, which may initiate the transport 202 to take an action, may further provide the information or additional information to the processor 204', which may initiate the transport 202' to take an action, may further provide the information or additional information to the mobile phone 220, the transport 222, and/or the computer 224. One or more of the applications, features, steps, solutions, etc., described and/or depicted herein may be utilized and/or provided by the instant elements.

Figure 2C:
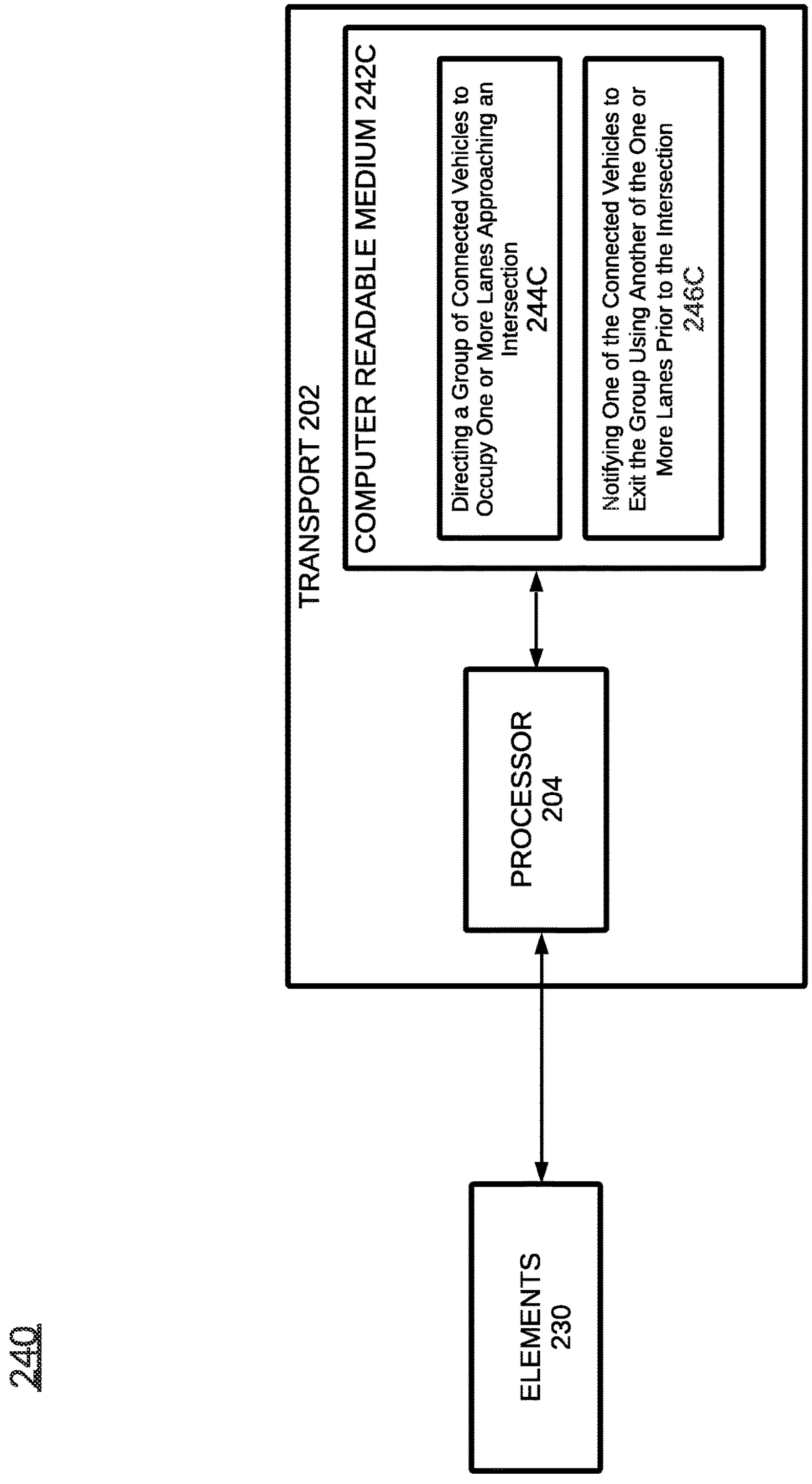
FIG. 2C illustrates yet another transport network diagram, according to example embodiments.

FIG. 2C illustrates yet another transport network diagram 240, according to example embodiments. The network comprises elements including a transport 202, a processor 204, and a non-transitory computer readable medium 242C. The processor 204 is communicably coupled to the computer readable medium 242C and elements 230 (which were depicted in FIG. 2B). The transport 202 could be a transport, server, or any device with a processor and memory.

The processor 204 performs one or more of directing a group of connected vehicles to occupy one or more lanes approaching an intersection 244C and notifying one of the connected vehicles to exit the group using another of the one or more lanes prior to the intersection 246C.

Figure 2D:
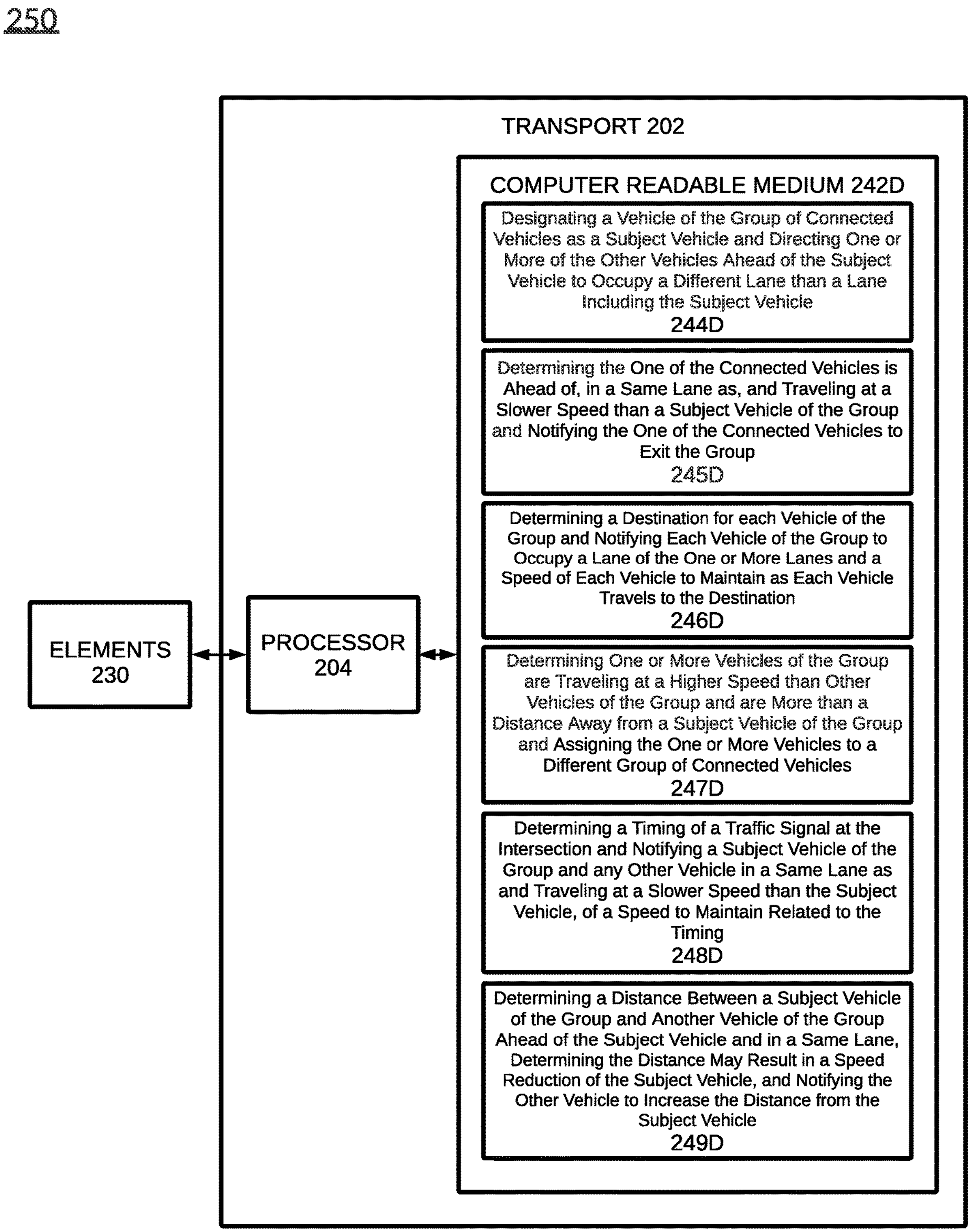
FIG. 2D illustrates a further transport network diagram, according to example embodiments.

FIG. 2D illustrates a further transport network diagram 250, according to example embodiments. The network comprises elements including a transport 202 a processor 204, and a non-transitory computer readable medium 242D. The processor 204 is communicably coupled to the computer readable medium 242D and elements 230 (which were depicted in FIG. 2B). The transport 202 could be a transport, server or any device with a processor and memory.

The processor 204 performs one or more of designating a vehicle of the group of connected vehicles as a subject vehicle 104 and directing one or more of the other vehicles 108 ahead of the subject vehicle 104 to occupy a different lane than a lane including the subject vehicle 104 244D, determining the one of the connected vehicles is ahead of, in a same lane as, and traveling at a slower speed than a subject vehicle 104 of the group and notifying the one of the connected vehicles to exit the group 245D, determining a destination for each vehicle of the group and notifying each vehicle of the group to occupy a lane of the one or more lanes and a speed of each vehicle to maintain as each vehicle travels to the destination 246D, determining one or more vehicles of the group are traveling at a higher speed than other vehicles 108 of the group and are more than a distance away from a subject vehicle 104 of the group and assigning the one or more vehicles to a different group of connected vehicles 247D, determining a timing of a traffic signal at the intersection and notifying a subject vehicle 104 of the group and any other vehicle 108 in a same lane as and traveling at a slower speed than the subject vehicle 104, of a speed to maintain related to the timing 248D, and determining a distance between a subject vehicle 104 of the group and another vehicle 108 of the group ahead of the subject vehicle 104 and in a same lane, determining the distance may result in a speed reduction of the subject vehicle 104, and notifying the other vehicle 108 to increase the distance from the subject vehicle 104 249D.

Figure 2E:
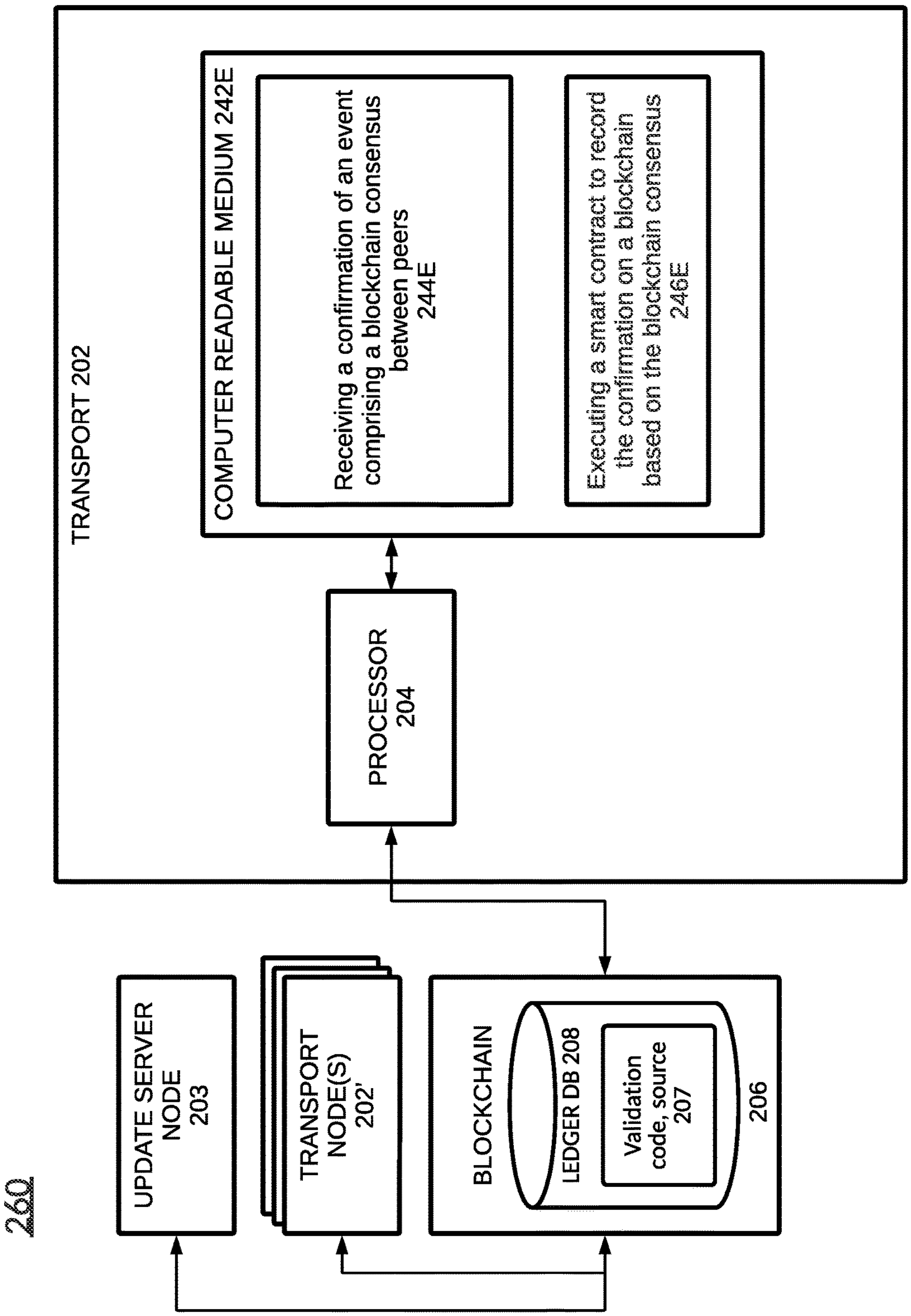
FIG. 2E illustrates yet a further transport network diagram, according to example embodiments.

FIG. 2E illustrates yet a further transport network diagram 260, according to example embodiments. Referring to FIG. 2E, the network diagram 260 includes a transport 202 connected to other transports 202' and to an update server node 203 over a blockchain network 206. The transports 202 and 202' may represent transports/vehicles. The blockchain network 206 may have a ledger 208 for storing software update validation data and a source 207 of the validation for future use (e.g., for an audit).

While this example describes in detail only one transport 202, multiple such nodes may be connected to the blockchain 206. It should be understood that the transport 202 may include additional components and that some of the components described herein may be removed and/or modified without departing from a scope of the instant application. The transport 202 may have a computing device or a server computer, or the like, and may include a processor 204, which may be a semiconductor-based microprocessor, a central processing unit (CPU), an application-specific integrated circuit (ASIC), a field-programmable gate array (FPGA), and/or another hardware device. Although a single processor 204 is depicted, it should be understood that the transport 202 may include multiple processors, multiple cores, or the like without departing from the scope of the instant application. The transport 202 could be a transport, server or any device with a processor and memory.

The processor 204 performs one or more of receiving a confirmation of an event from one or more elements described or depicted herein, wherein the confirmation comprises a blockchain consensus between peers represented by any of the elements 244E and executing a smart contract to record the confirmation on a blockchain-based on the blockchain consensus 246E. Consensus is formed between one or more of any element 230 and/or any element described or depicted herein, including a transport, a server, a wireless device, etc. In another example, the transport 202 can be one or more of any element 230 and/or any element described or depicted herein, including a server, a wireless device, etc.

The processors and/or computer readable medium 242E may fully or partially reside in the interior or exterior of the transports. The steps or features stored in the computer readable medium 242E may be fully or partially performed by any of the processors and/or elements in any order. Additionally, one or more steps or features may be added, omitted, combined, performed at a later time, etc.

Figure 2F:
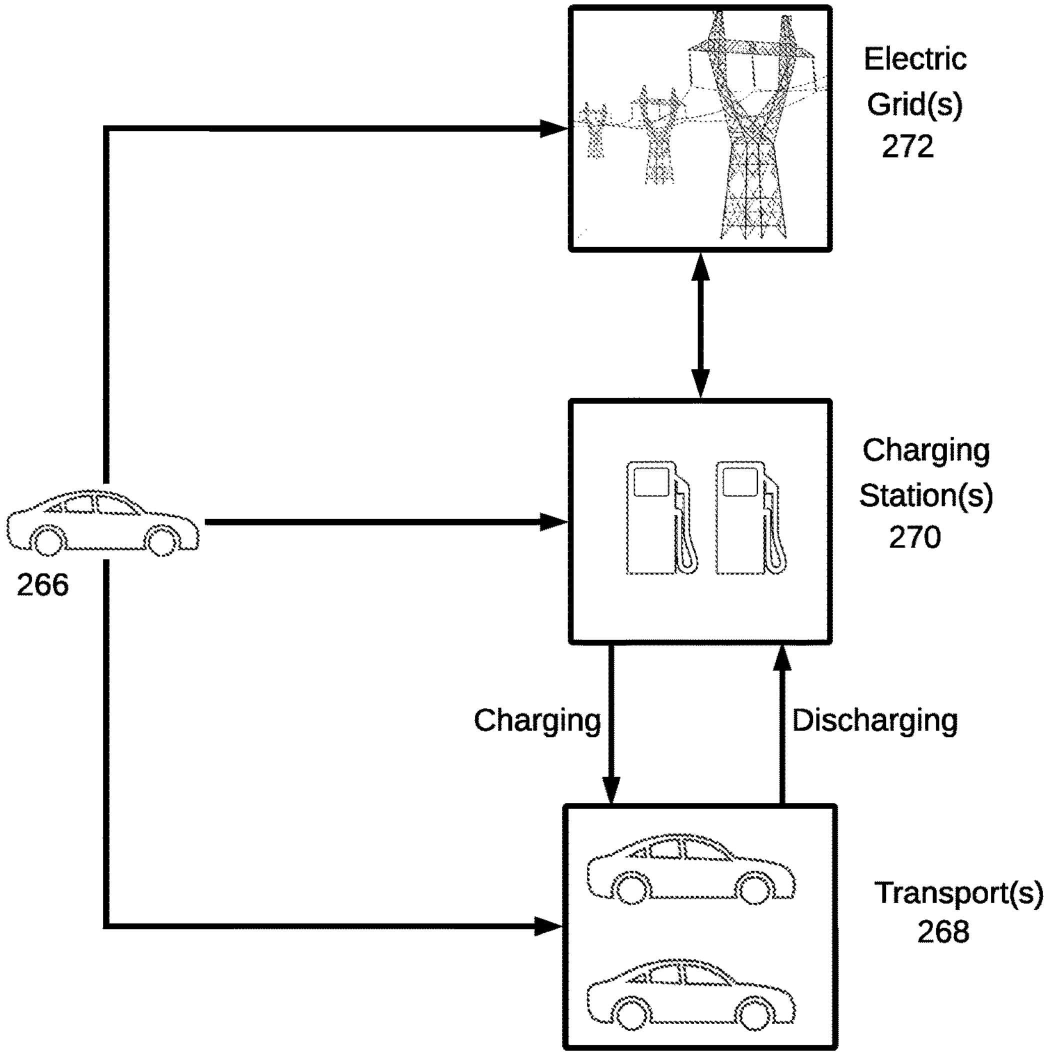
FIG. 2F illustrates a diagram depicting electrification of one or more elements, according to example embodiments.

FIG. 2F illustrates a diagram 265 depicting the electrification of one or more elements. In one example, a transport 266 may provide power stored in its batteries to one or more elements, including other transport(s) 268, charging station (s) 270, and electric grid(s) 272. The electric grid(s) 272 is/are coupled to one or more of the charging stations 270, which may be coupled to one or more of the transports 268. This configuration allows the distribution of electricity/power received from the transport 266. The transport 266 may also interact with the other transport(s) 268, such as via Vehicle to Vehicle (V2V) technology, communication over cellular, WiFi, and the like. The transport 266 may also interact wirelessly and/or wired with other transports 268, the charging station(s) 270 and/or with the electric grid(s) 272. In one example, the transport 266 is routed (or routes itself) in a safe and efficient manner to the electric grid(s) 272, the charging station(s) 270, or the other transport(s) 268. Using one or more embodiments of the instant solution, the transport 266 can provide energy to one or more of the elements depicted herein in various advantageous ways as described and/or depicted herein. Further, the safety and efficiency of the transport may be increased, and the environment may be positively affected as described and/or depicted herein.

The term 'energy', 'electricity', 'power', and the like may be used to denote any form of energy received, stored, used, shared, and/or lost by the vehicles(s). The energy may be referred to in conjunction with a voltage source and/or a current supply of charge provided from an entity to the transport(s) during a charge/use operation. Energy may also be in the form of fossil fuels (for example, for use with a hybrid transport) or via alternative power sources, including but not limited to lithium-based, nickel-based, hydrogen fuel cells, atomic/nuclear energy, fusion-based energy sources, and energy generated on-the-fly during an energy sharing and/or usage operation for increasing or decreasing one or more transports energy levels at a given time.

In one example, the charging station 270 manages the amount of energy transferred from the transport 266 such that there is sufficient charge remaining in the transport 266 to arrive at a destination. In one example, a wireless connection is used to wirelessly direct an amount of energy transfer between transports 268, wherein the transports may both be in motion. In one embodiment, wireless charging may occur via a fixed charger and batteries of the transport in alignment with one another (such as a charging mat in a garage or parking space). In one example, an idle vehicle, such as a vehicle 266 (which may be autonomous) is directed to provide an amount of energy to a charging station 270 and return to the original location (for example, its original location or a different destination). In one example, a mobile energy storage unit (not shown) is used to collect surplus energy from at least one other transport 268 and transfer the stored surplus energy at a charging station 270. In one example, factors determine an amount of energy to transfer to a charging station 270, such as distance, time, as well as traffic conditions, road conditions, environmental/weather conditions, the vehicle's condition (weight, etc.), an occupant(s) schedule while utilizing the vehicle, a prospective occupant(s) schedule waiting for the vehicle, etc. In one example, the transport(s) 268, the charging station(s) 270 and/or the electric grid(s) 272 can provide energy to the transport 266.

In one embodiment, a location such as a building, a residence, or the like (not depicted), communicably coupled to one or more of the electric grid 272, the transport 266, and/or the charging station(s) 270. The rate of electric flow to one or more of the location, the transport 266, the other transport(s) 268 is modified, depending on external conditions, such as weather. For example, when the external temperature is extremely hot or extremely cold, raising the chance for an outage of electricity, the flow of electricity to a connected vehicle 266/268 is slowed to help minimize the chance for an outage.

In one embodiment, transports 266 and 268 may be utilized as bidirectional transports. Bidirectional transports are those that may serve as mobile microgrids that can assist in the supplying of electrical power to the grid 272 and/or reduce the power consumption when the grid is stressed. Bidirectional transports incorporate bidirectional charging, which in addition to receiving a charge to the transport, the transport can take energy from the transport and "push" the energy back into the grid 272, otherwise referred to as "V2G". In bidirectional charging, the electricity flows both ways; to the transport and from the transport. When a transport is charged, alternating current (AC) electricity from the grid 272 is converted to direct current (DC). This may be performed by one or more of the transport's own converter or a converter on the charger 270. The energy stored in the transport's batteries may be sent in an opposite direction back to the grid. The energy is converted from DC to AC through a converter usually located in the charger 270, otherwise referred to as a bidirectional charger. Further, the instant solution as described and depicted with respect to FIG. 2F can be utilized in this and other networks and/or systems.

Figure 2G:
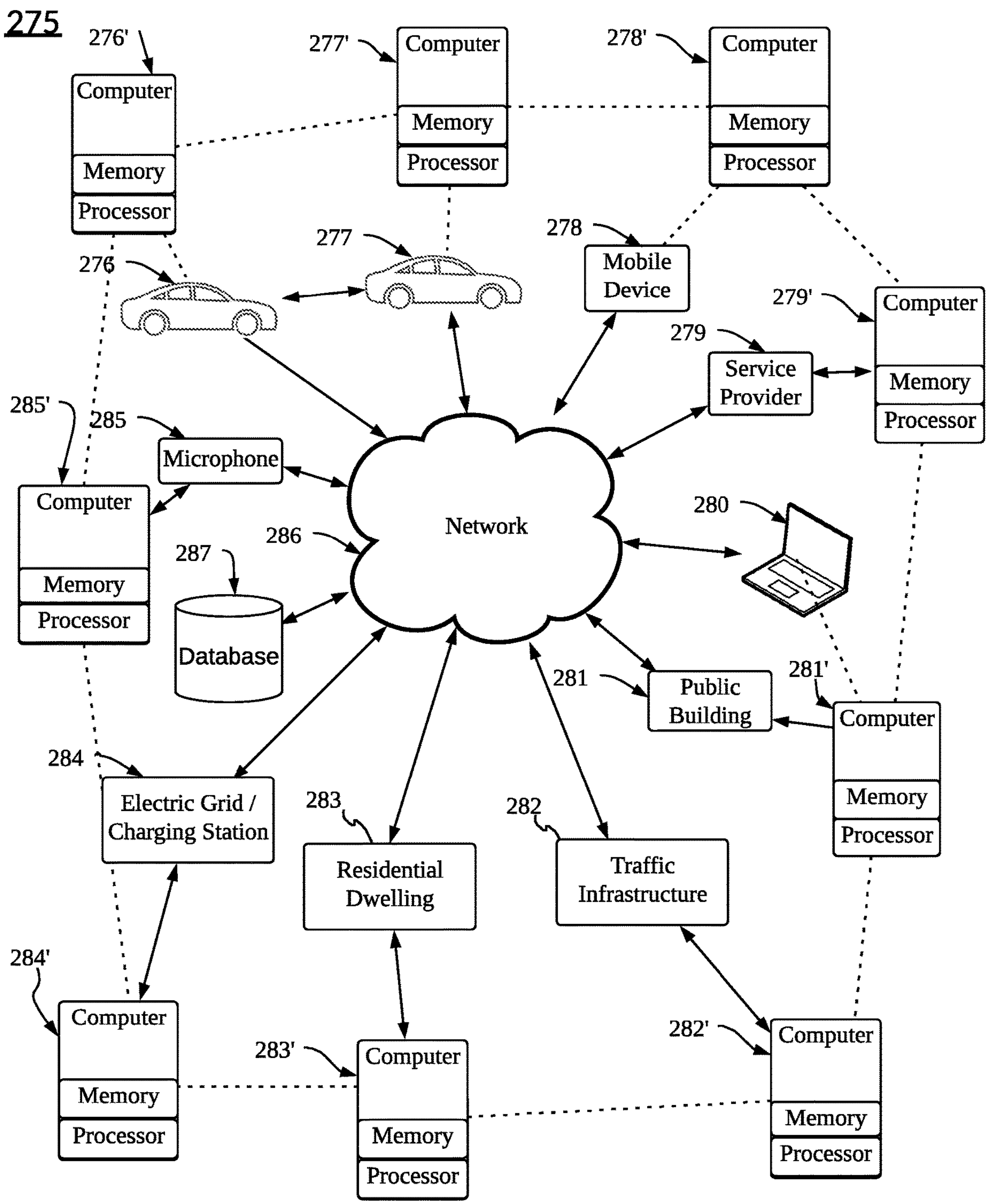
FIG. 2G illustrates a diagram depicting interconnections between different elements, according to example embodiments.

FIG. 2G is a diagram showing interconnections between different elements 275. The instant solution may be stored and/or executed entirely or partially on and/or by one or more computing devices 278', 279', 281', 282', 283', 284', 276', 285', 287' and 277' associated with various entities, all communicably coupled and in communication with a network 286. A database 287 is communicably coupled to the network and allows for the storage and retrieval of data. In one example, the database is an immutable ledger. One or more of the various entities may be a transport 276, one or more service provider 279, one or more public buildings 281, one or more traffic infrastructure 282, one or more residential dwellings 283, an electric grid/charging station 284, a microphone 285, and/or another transport 277. Other entities and/or devices, such as one or more private users using a smartphone 278, a laptop 280, an augmented reality (AR) device, a virtual reality (VR) device, and/or any wearable device may also interwork with the instant solution. The smartphone 278, laptop 280, the microphone 285, and other devices may be connected to one or more of the connected computing devices 278', 279', 281', 282', 283', 284', 276', 285', 287', and 277'. The one or more public buildings 281 may include various agencies. The one or more public buildings 281 may utilize a computing device 281'. The one or more service provider 279 may include a dealership, a tow truck service, a collision center or other repair shop. The one or more service provider 279 may utilize a computing apparatus 279'. These various computer devices may be directly and/or communicably coupled to one another, such as via wired networks, wireless networks, blockchain networks, and the like. The microphone 285 may be utilized as a virtual assistant, in one example. In one example, the one or more traffic infrastructure 282 may include one or more traffic signals, one or more sensors including one or more cameras, vehicle speed sensors or traffic sensors, and/or other traffic infrastructure. The one or more traffic infrastructure 282 may utilize a computing device 282'.

In one embodiment, anytime an electrical charge is given or received to/from a charging station and/or an electrical grid, the entities that allow that to occur are one or more of a vehicle, a charging station, a server, and a network communicably coupled to the vehicle, the charging station, and the electrical grid.

In one example, a transport 277/276 can transport a person, an object, a permanently or temporarily affixed apparatus, and the like. In one example, the transport 277 may communicate with transport 276 via V2V communication through the computers associated with each transport 276' and 277' and may be referred to as a transport, car, vehicle, automobile, and the like. The transport 276/277 may be a self-propelled wheeled conveyance, such as a car, a sports utility vehicle, a truck, a bus, a van, or other motor or battery-driven or fuel cell-driven transport. For example, transport 276/277 may be an electric vehicle, a hybrid vehicle, a hydrogen fuel cell vehicle, a plug-in hybrid vehicle, or any other type of vehicle with a fuel cell stack, a motor, and/or a generator. Other examples of vehicles include bicycles, scooters, trains, planes, boats, and any other form of conveyance that is capable of transportation. The transport 276/277 may be semi-autonomous or autonomous. For example, transport 276/277 may be self-maneuvering and navigate without human input. An autonomous vehicle may have and use one or more sensors and/or a navigation unit to drive autonomously.

Figure 2H:
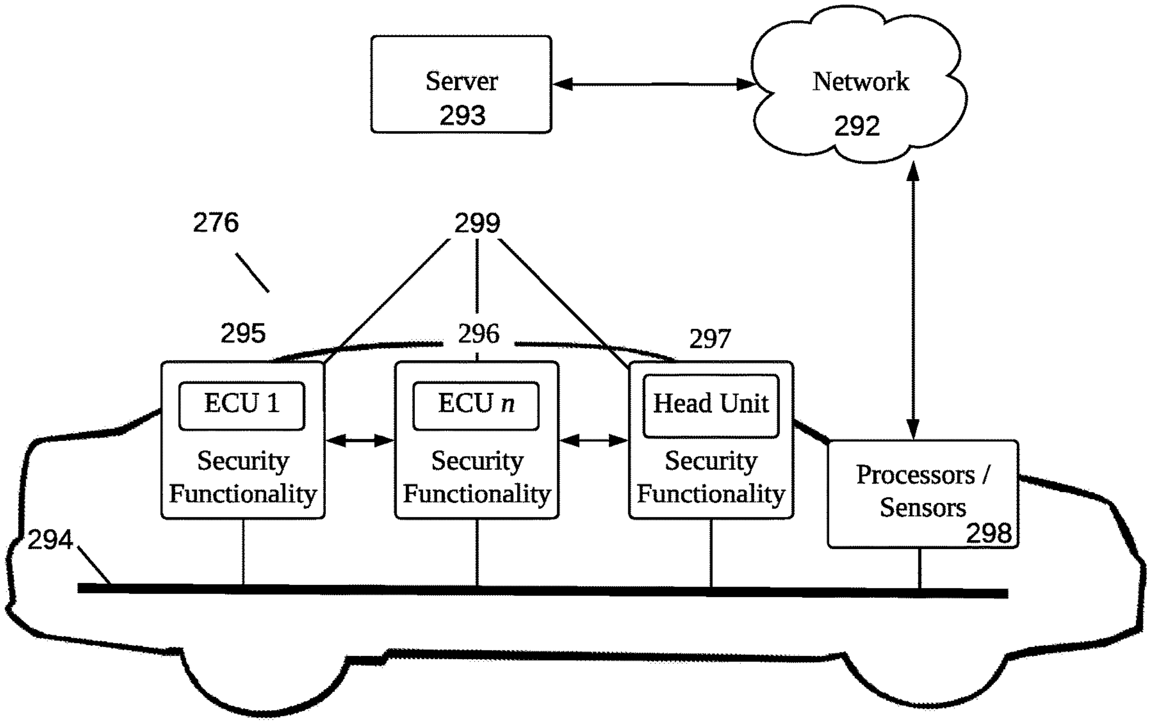
FIG. 2H illustrates a further diagram depicting interconnections between different elements, according to example embodiments.

FIG. 2H is another block diagram showing interconnections between different elements in one example 290. A transport 276 is presented and includes ECUs 295, 296, and a Head Unit (otherwise known as an Infotainment System) 297. An Electrical Control Unit (ECU) is an embedded system in automotive electronics controlling one or more of the electrical systems or subsystems in a transport. ECUs may include but are not limited to the management of a transport's engine, brake system, gearbox system, door locks, dashboard, airbag system, infotainment system, electronic differential, and active suspension. ECUs are connected to the transport's Controller Area Network (CAN) bus 294. The ECUs may also communicate with a transport computer 298 via the CAN bus 294. The transport's processors/sensors (such as the transport computer) 298 can communicate with external elements, such as a server 293 via a network 292 (such as the Internet). Each ECU 295, 296, and Head Unit 297 may contain its own security policy. The security policy defines permissible processes that can be executed in the proper context. In one example, the security policy may be partially or entirely provided in the transport computer 298.

ECUs 295, 296, and Head Unit 297 may each include a custom security functionality element 299 defining authorized processes and contexts within which those processes are permitted to run. Context-based authorization to determine validity if a process can be executed allows ECUs to maintain secure operation and prevent unauthorized access from elements such as the transport's Controller Area Network (CAN Bus). When an ECU encounters a process that is unauthorized, that ECU can block the process from operating. Automotive ECUs can use different contexts to determine whether a process is operating within its permitted bounds, such as proximity contexts such as nearby objects, distance to approaching objects, speed, and trajectory relative to other moving objects, and operational contexts such as an indication of whether the transport is moving or parked, the transport's current speed, the transmission state, user-related contexts such as devices connected to the transport via wireless protocols, use of the infotainment, cruise control, parking assist, driving assist, location-based contexts, and/or other contexts.

Figure 2I:
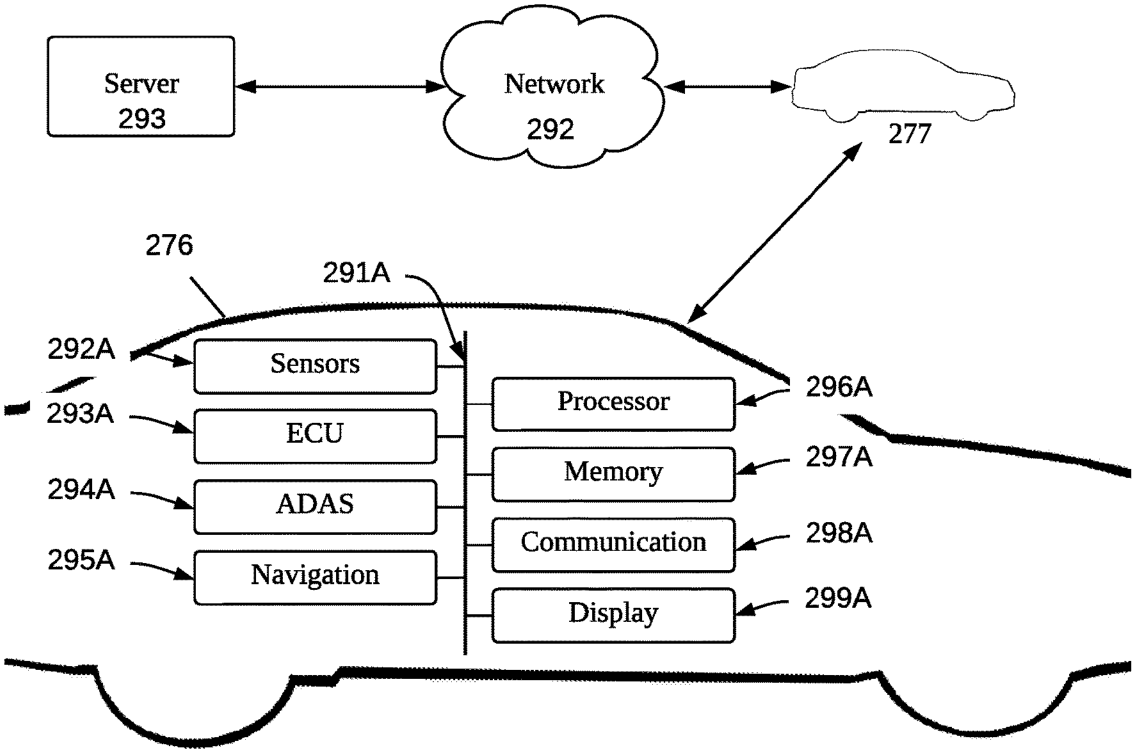
FIG. 2I illustrates yet a further diagram depicting interconnections between elements, according to example embodiments.

Referring to FIG. 2I, an operating environment 290A for a connected transport, is illustrated according to some embodiments. As depicted, the transport 276 includes a Controller Area Network (CAN) bus 291A connecting elements 292A-299A of the transport. Other elements may be connected to the CAN bus and are not depicted herein. The depicted elements connected to the CAN bus include a sensor set 292A, Electronic Control Units 293A, autonomous features or Advanced Driver Assistance Systems (ADAS) 294A, and the navigation system 295A. In some embodiments, the transport 276 includes a processor 296A, a memory 297A, a communication unit 298A, and an electronic display 299A.

The processor 296A includes an arithmetic logic unit, a microprocessor, a general-purpose controller, and/or a similar processor array to perform computations and provide electronic display signals to a display unit 299A. The processor 296A processes data signals and may include various computing architectures, including a complex instruction set computer (CISC) architecture, a reduced instruction set computer (RISC) architecture, or an architecture implementing a combination of instruction sets. The transport 276 may include one or more processors 296A. Other processors, operating systems, sensors, displays, and physical configurations that are communicably coupled to one another (not depicted) may be used with the instant solution.

Memory 297A is a non-transitory memory storing instructions or data that may be accessed and executed by the processor 296A. The instructions and/or data may include code to perform the techniques described herein. The memory 297A may be a dynamic random-access memory (DRAM) device, a static random-access memory (SRAM) device, flash memory, or another memory device. In some embodiments, the memory 297A also may include non-volatile memory or a similar permanent storage device and media, which may include a hard disk drive, a floppy disk drive, a CD-ROM device, a DVD-ROM device, a DVD-RAM device, a DVD-RW device, a flash memory device, or some other mass storage device for storing information on a permanent basis. A portion of the memory 297A may be reserved for use as a buffer or virtual random-access memory (virtual RAM). The transport 276 may include one or more memories 297A without deviating from the current solution.

The memory 297A of the transport 276 may store one or more of the following types of data: navigation route data 295A, and autonomous features data 294A. In some embodiments, the memory 297A stores data that may be necessary for the navigation application 295A to provide the functions.

The navigation system 295A may describe at least one navigation route including a start point and an endpoint. In some embodiments, the navigation system 295A of the transport 276 receives a request from a user for navigation routes wherein the request includes a starting point and an ending point. The navigation system 295A may query a real-time data server 293 (via a network 292), such as a server that provides driving directions, for navigation route data corresponding to navigation routes, including the start point and the endpoint. The real-time data server 293 transmits the navigation route data to the transport 276 via a wireless network 292, and the communication system 298A stores the navigation data 295A in the memory 297A of the transport 276.

The ECU 293A controls the operation of many of the systems of the transport 276, including the ADAS systems 294A. The ECU 293A may, responsive to instructions received from the navigation system 295A, deactivate any unsafe and/or unselected autonomous features for the duration of a journey controlled by the ADAS systems 294A. In this way, the navigation system 295A may control whether ADAS systems 294A are activated or enabled so that they may be activated for a given navigation route.

The sensor set 292A may include any sensors in the transport 276 generating sensor data. For example, the sensor set 292A may include short-range sensors and long-range sensors. In some embodiments, the sensor set 292A of the transport 276 may include one or more of the following vehicle sensors: a camera, a Lidar sensor, an ultrasonic sensor, an automobile engine sensor, a radar sensor, a laser altimeter, a manifold absolute pressure sensor, an infrared detector, a motion detector, a thermostat, a sound detector, a carbon monoxide sensor, a carbon dioxide sensor, an oxygen sensor, a mass airflow sensor, an engine coolant temperature sensor, a throttle position sensor, a crankshaft position sensor, a valve timer, an air-fuel ratio meter, a blind spot meter, a curb feeler, a defect detector, a Hall effect sensor, a parking sensor, a radar gun, a speedometer, a speed sensor, a tire-pressure monitoring sensor, a torque sensor, a transmission fluid temperature sensor, a turbine speed sensor (TSS), a variable reluctance sensor, a vehicle speed sensor (VSS), a water sensor, a wheel speed sensor, a GPS sensor, a mapping functionality, and any other type of automotive sensor. The navigation system 295A may store the sensor data in the memory 297A.

The communication unit 298A transmits and receives data to and from the network 292 or to another communication channel. In some embodiments, the communication unit 298A may include a DSRC transceiver, a DSRC receiver, and other hardware or software necessary to make the transport 276 a DSRC-equipped device.

The transport 276 may interact with other transports 277 via V2V technology. V2V communication includes sensing radar information corresponding to relative distances to external objects, receiving GPS information of the transports, setting areas as areas where the other transports 277 are located based on the sensed radar information, calculating probabilities that the GPS information of the object vehicles will be located at the set areas, and identifying transports and/or objects corresponding to the radar information and the GPS information of the object vehicles based on the calculated probabilities, in one example.

For a transport to be adequately secured, the transport must be protected from unauthorized physical access as well as unauthorized remote access (e.g., cyber-threats). To prevent unauthorized physical access, a transport is equipped with a secure access system such as a keyless entry in one example. Meanwhile, security protocols are added to a transport's computers and computer networks to facilitate secure remote communications to and from the transport in one example.

Electronic Control Units (ECUs) are nodes within a transport that control tasks such as activating the windshield wipers to tasks such as an anti-lock brake system. ECUs are often connected to one another through the transport's central network, which may be referred to as a controller area network (CAN). State-of-the-art features such as autonomous driving are strongly reliant on implementing new, complex ECUs such as advanced driver-assistance systems (ADAS), sensors, and the like. While these new technologies have helped improve the safety and driving experience of a transport, they have also increased the number of externally-communicating units inside of the transport, making them more vulnerable to attack. Below are some examples of protecting the transport from physical intrusion and remote intrusion.

Figure 2J:
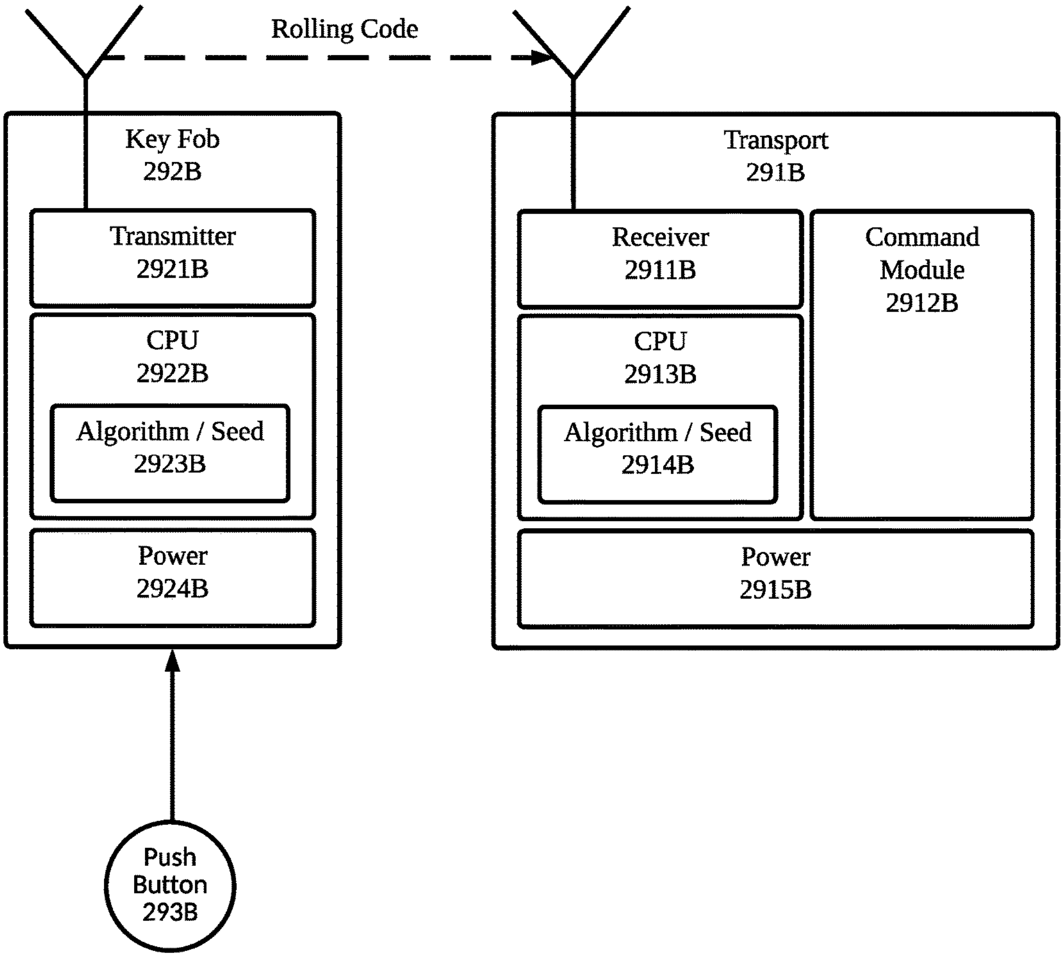
FIG. 2J illustrates yet a further diagram depicting a keyless entry system, according to example embodiments.

FIG. 2J illustrates a keyless entry system 290B to prevent unauthorized physical access to a transport 291B, according to example embodiments. Referring to FIG. 2J, a key fob 292B transmits commands to a transport 291B using radio frequency signals in one example. In this example, the key fob 292B includes a transmitter 2921B with an antenna that is capable of sending short-range wireless radio signals. The transport 291B includes a receiver 2911B with an antenna that is capable of receiving the short-range wireless signal transmitted from the transmitter 2921B. The key fob 292B and the transport 291B also include CPUs 2922B and 2913B, respectively, which control the respective devices. Here, a memory of the CPUs 2922B and 2913B (or accessible to the CPUs). Each of the key fob 292B and the transport 291B includes power supplies 2924B and 2915B for powering the respective devices in one example.

When the user presses a button 293B (or otherwise actuates the fob, etc.) on the key fob 292B, the CPU 2922B wakes up inside the key fob 292B and sends a data stream to the transmitter 2921B, which is output via the antenna. In other embodiments, the user's intent is acknowledged on the key fob 292B via other means, such as via a microphone that accepts audio, a camera that captures images and/or video, or other sensors that are commonly utilized in the art to detect intent from a user including receiving gestures, motion, eye movements, and the like. The data stream may be a 64-bit to 128-bit long signal, which includes one or more of a preamble, a command code, and a rolling code. The signal may be sent at a rate between 2 KHz and 20 KHz, but embodiments are not limited thereto. In response, the receiver 2911B of the transport 291B captures the signal from the transmitter 2921B, demodulates the signal, and sends the data stream to the CPU 2913B, which decodes the signal and sends commands (e.g., lock the door, unlock the door, etc.) to a command module 2912B.

If the key fob 292B and the transport 291B use a fixed code between them, replay attacks can be performed. In this case, if the attacker can capture/sniff the fixed code during the short-range communication, the attacker could replay this code to gain entry into the transport 291B. To improve security, the key fob and the transport 291B may use a rolling code that changes after each use. Here, the key fob 292B and the transport 291B are synchronized with an initial seed 2923B (e.g., a random number, pseudo-random number, etc.). This is referred to as pairing. The key fob 292B and the transport 291B also include a shared algorithm for modifying the initial seed 2914B each time the button 293B is pressed. The following keypress will take the result of the previous keypress as an input and transform it into the next number in the sequence. In some cases, the transport 291B may store multiple next codes (e.g., 255 next codes) in case the keypress on the key fob 292B is not detected by the transport 291B. Thus, a number of keypress on the key fob 292B that are unheard by the transport 291B do not prevent the transport from becoming out of sync.

In addition to rolling codes, the key fob 292B and the transport 291B may employ other methods to make attacks even more difficult. For example, different frequencies may be used for transmitting the rolling codes. As another example, two-way communication between the transmitter 2921B and the receiver 2911B may be used to establish a secure session. As another example, codes may have limited expirations or timeouts. Further, the instant solution as described and depicted with respect to FIG. 2J can be utilized in this and other networks and/or systems, including those that are described and depicted herein.

Figure 2K:
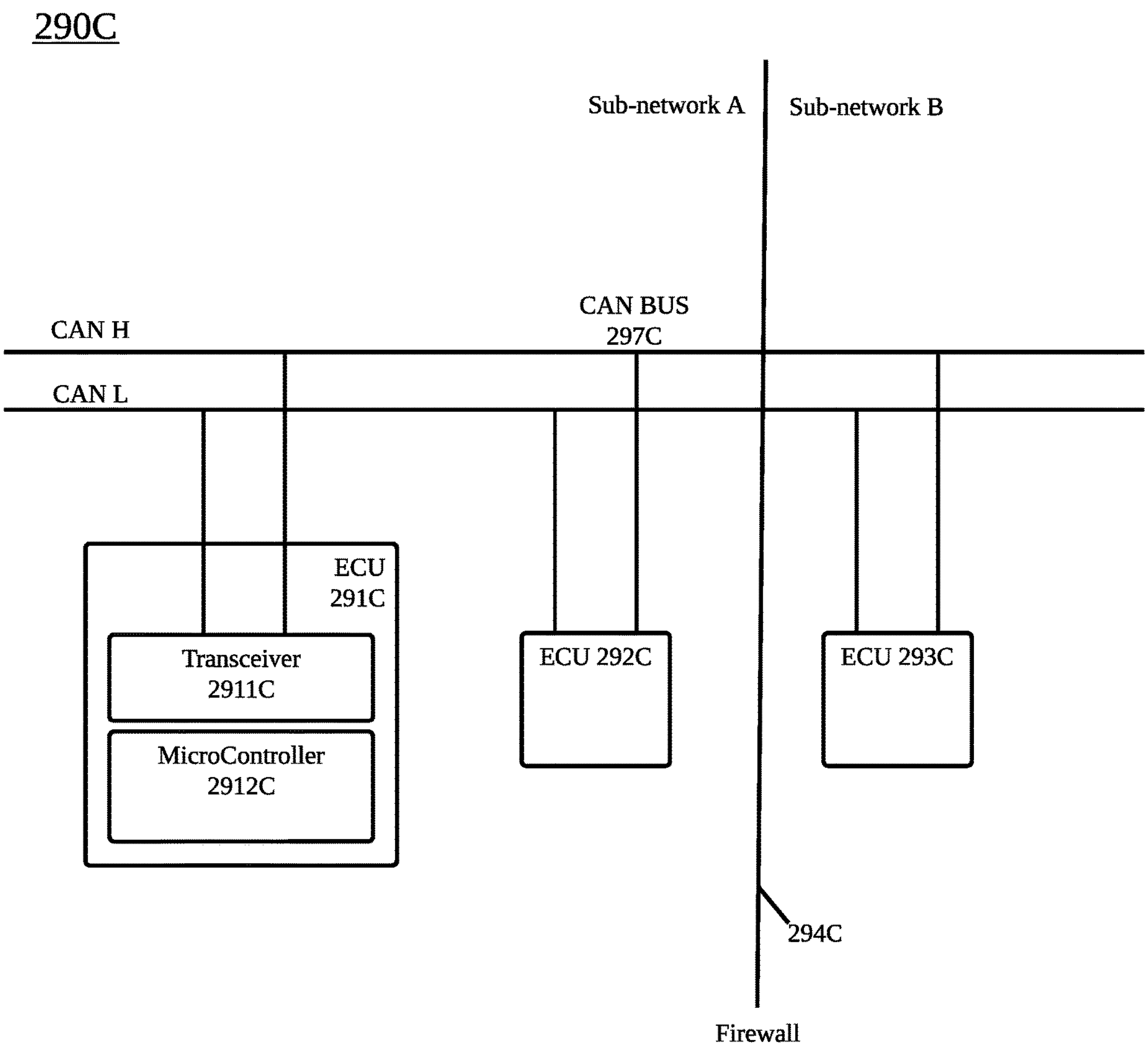
FIG. 2K illustrates yet a further diagram depicting a CAN within a transport, according to example embodiments.

FIG. 2K illustrates a controller area network (CAN) 290C within a transport, according to example embodiments. Referring to FIG. 2K, the CAN 290C includes a CAN bus 297C with a high and low terminal and a plurality of electronic control units (ECUs) 291C, 292C, 293C, etc. which are connected to the CAN bus 297C via wired connections. The CAN bus 297C is designed to allow microcontrollers and devices to communicate with each other in an application without a host computer. The CAN bus 297C implements a message-based protocol (i.e., ISO 11898 standards) that allows ECUs 291C-293C to send commands to one another at a root level. Meanwhile, the ECUs 291C-293C represent controllers for controlling electrical systems or subsystems within the transport. Examples of the electrical systems include power steering, anti-lock brakes, air-conditioning, tire pressure monitoring, cruise control, and many other features.

In this example, the ECU 291C includes a transceiver 2911C and a microcontroller 2912C. The transceiver may be used to transmit and receive messages to and from the CAN bus 297C. For example, the transceiver 2911C may convert the data from the microcontroller 2912C into a format of the CAN bus 297C and also convert data from the CAN bus 297C into a format for the microcontroller 2912C. Meanwhile, the microcontroller 2912C interprets the messages and also decide what messages to send using ECU software installed therein in one example.

To protect the CAN 290C from cyber threats, various security protocols may be implemented. For example, sub-networks (e.g., sub-networks A and B, etc.) may be used to divide the CAN 290C into smaller sub-CANs and limit an attacker's capabilities to access the transport remotely. In the example of FIG. 2K, ECUs 291C and 292C may be part of a same sub-network, while ECU 293C is part of an independent sub-network. Furthermore, a firewall 294C (or gateway, etc.) may be added to block messages from crossing the CAN bus 297C across sub-networks. If an attacker gains access to one sub-network, the attacker will not have access to the entire network. To make sub-networks even more secure, the most critical ECUs are not placed on the same sub-network, in one example.

Although not shown in FIG. 2K, other examples of security controls within a CAN include an intrusion detection system (IDS) which can be added to each sub-network and read all data passing to detect malicious messages. If a malicious message is detected, the IDS can notify the automobile user. Other possible security protocols include encryption/security keys that can be used to obscure messages. As another example, authentication protocols are implemented that enables a message to authenticate itself, in one example.

In addition to protecting a transport's internal network, transports may also be protected when communicating with external networks such as the Internet. One of the benefits of having a transport connection to a data source such as the Internet is that information from the transport can be sent through a network to remote locations for analysis. Examples of transport information include GPS, onboard diagnostics, tire pressure, and the like. These communication systems are often referred to as telematics because they involve the combination of telecommunications and informatics. Further, the instant solution as described and depicted with respect to FIG. 2K can be utilized in this and other networks and/or systems, including those that are described and depicted herein.

Figure 2L:
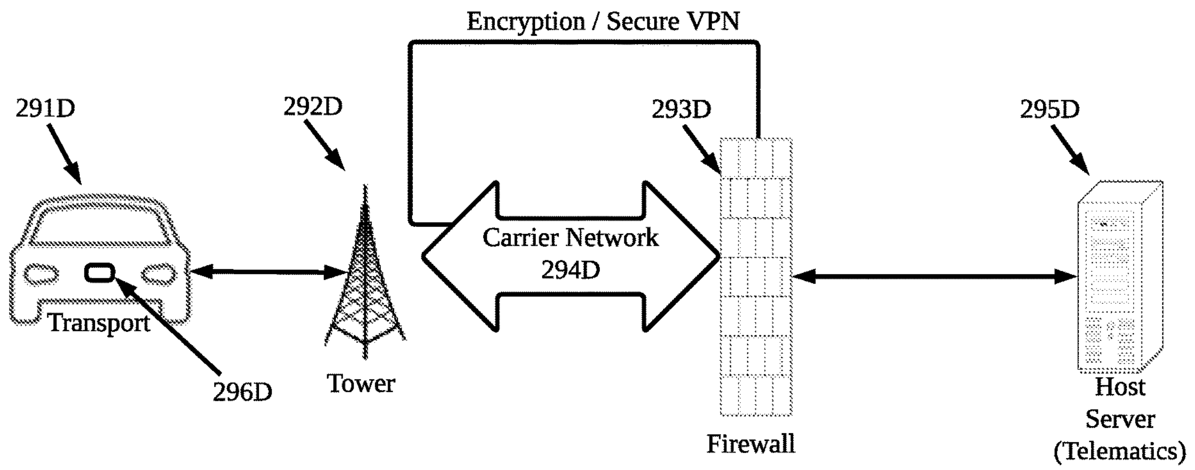
FIG. 2L illustrates yet a further diagram depicting an end-to-end communication channel, according to example embodiments.

FIG. 2L illustrates a secure end-to-end transport communication channel according to example embodiments. Referring to FIG. 2L, a telematics network 290D includes a transport 291D and a host server 295D that is disposed at a remote location (e.g., a web server, a cloud platform, a database, etc.) and connected to the transport 291D via a network such as the Internet. In this example, a device 296D associated with the host server 295D may be installed within the network inside the transport 291D. Furthermore, although not shown, the device 296D may connect to other elements of the transport 291D, such as the CAN bus, an onboard diagnostics (ODBII) port, a GPS system, a SIM card, a modem, and the like. The device 296D may collect data from any of these systems and transfer the data to the server 295D via the network.

Secure management of data begins with the transport 291D. In some embodiments, the device 296D may collect information before, during, and after a trip. The data may include GPS data, travel data, passenger information, diagnostic data, fuel data, speed data, and the like. However, the device 296D may only communicate the collected information back to the host server 295D in response to transport ignition and trip completion. Furthermore, communication may only be initiated by the device 296D and not by the host server 295D. As such, the device 296D will not accept communications initiated by outside sources in one example.

To perform the communication, the device 296D may establish a secured private network between the device 296D and the host server 295D. Here, the device 296D may include a tamper-proof SIM card that provides secure access to a carrier network 294D via a radio tower 292D. When preparing to transmit data to the host server 295D, the device 296D may establish a one-way secure connection with the host server 295D. The carrier network 294D may communicate with the host server 295D using one or more security protocols. As a non-limiting example, the carrier network 294D may communicate with the host server 295D via a VPN tunnel which allows access through a firewall 293D of the host server 295D. As another example, the carrier network 294D may use data encryption (e.g., AES encryption, etc.) when transmitting data to the host server 295D. In some cases, the system may use multiple security measures such as both a VPN and encryption to further secure the data.

In addition to communicating with external servers, transports may also communicate with each other. In particular, transport-to-transport (V2V) communication systems enable transports to communicate with each other, roadside infrastructures (e.g., traffic lights, signs, cameras, parking meters, etc.), and the like, over a wireless network. The wireless network may include one or more of Wi-Fi networks, cellular networks, dedicated short-range communication (DSRC) networks, and the like. Transports may use V2V communication to provide other transports with information about a transport's speed, acceleration, braking, and direction, to name a few. Accordingly, transports can receive insight into the conditions ahead before such conditions become visible, thus greatly reducing collisions. Further, the instant solution as described and depicted with respect to FIG. 2L can be utilized in this and other networks and/or systems, including those that are described and depicted herein.

Figure 2M:
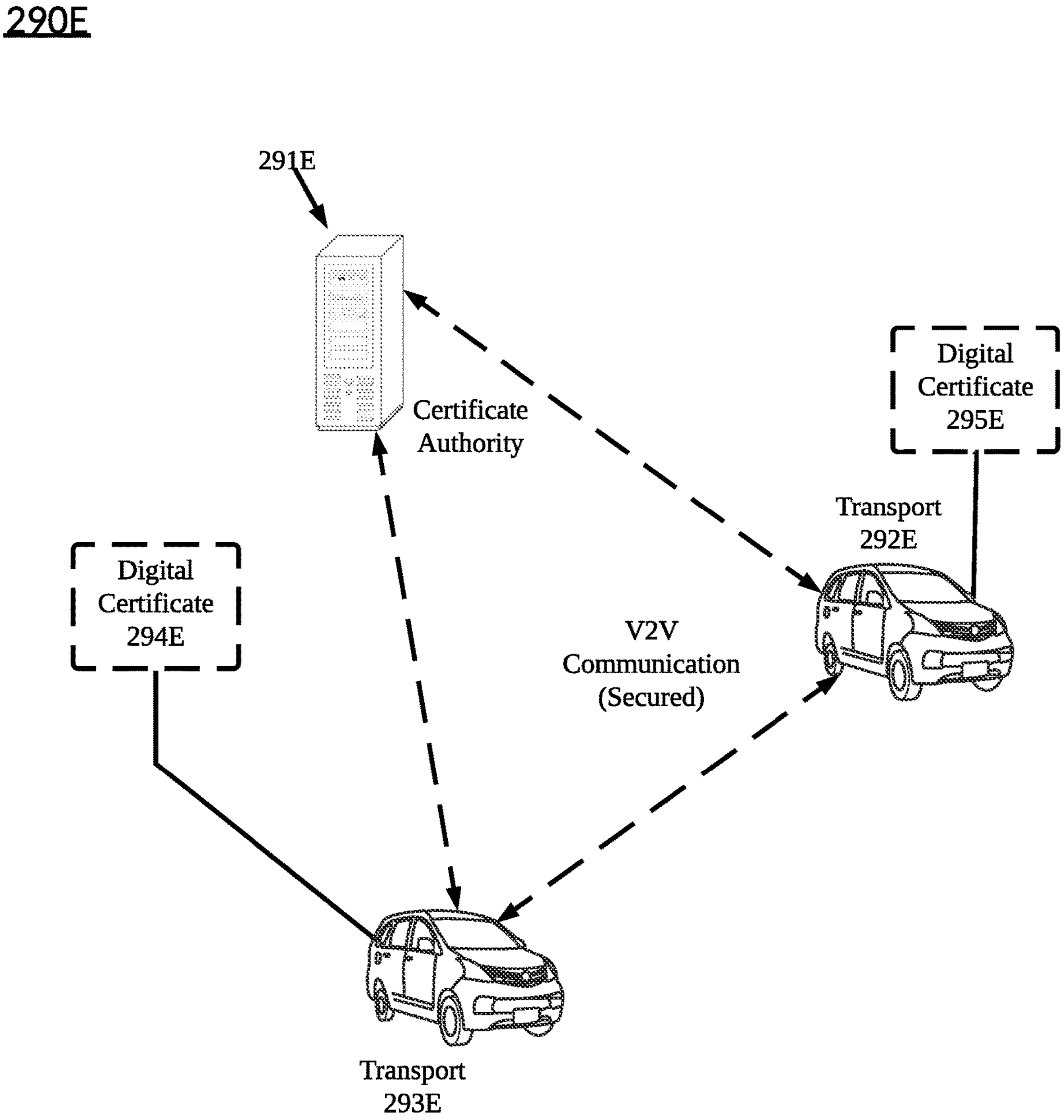
FIG. 2M illustrates yet a further diagram depicting an example of transports performing secured V2V communications using security certificates, according to example embodiments.

FIG. 2M illustrates an example 290E of transports 293E and 292E performing secured V2V communications using security certificates, according to example embodiments. Referring to FIG. 2M, the transports 293E and 292E may communicate via V2V communications over a short-range network, a cellular network, or the like. Before sending messages, the transports 293E and 292E may sign the messages using a respective public key certificate. For example, the transport 293E may sign a V2V message using a public key certificate 294E. Likewise, the transport 292E may sign a V2V message using a public key certificate 295E. The public key certificates 294E and 295E are associated with the transports 293E and 292E, respectively, in one example.

Upon receiving the communications from each other, the transports may verify the signatures with a certificate authority 291E or the like. For example, the transport 292E may verify with the certificate authority 291E that the public key certificate 294E used by transport 293E to sign a V2V communication is authentic. If the transport 292E successfully verifies the public key certificate 294E, the transport knows that the data is from a legitimate source. Likewise, the transport 293E may verify with the certificate authority 291E that the public key certificate 295E used by the transport 292E to sign a V2V communication is authentic. Further, the instant solution as described and depicted with respect to FIG. 2M can be utilized in this and other networks and/or systems including those that are described and depicted herein.

Figure 2N:
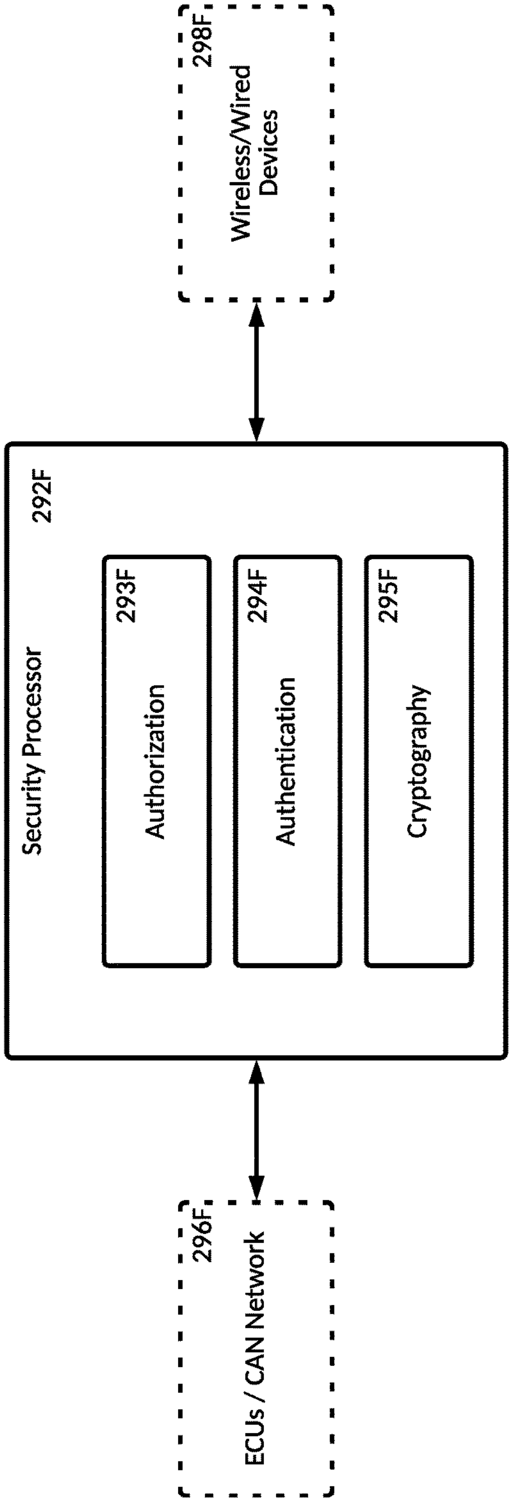
FIG. 2N illustrates yet a further diagram depicting an example of a transport interacting with a security processor and a wireless device, according to example embodiments.

FIG. 2N illustrates yet a further diagram 290F depicting an example of a transport interacting with a security processor and a wireless device, according to example embodiments. In some embodiments, the computer 224 shown in FIG. 2B may include security processor 292F as shown in the process 290F of the example of FIG. 2N. In particular, the security processor 292F may perform authorization, authentication, cryptography (e.g., encryption), and the like, for data transmissions that are sent between ECUs and other devices on a CAN bus of a vehicle, and also data messages that are transmitted between different vehicles.

In the example of FIG. 2N, the security processor 292F may include an authorization module 293F, an authentication module 294F, and a cryptography module 295F. The security processor 292F may be implemented within the transport's computer and may communicate with other transport elements, for example, the ECUs/CAN network 296F, wired and wireless devices 298F such as wireless network interfaces, input ports, and the like. The security processor 292F may ensure that data frames (e.g., CAN frames, etc.) that are transmitted internally within a transport (e.g., via the ECUs/CAN network 296F) are secure. Likewise, the security processor 292F can ensure that messages transmitted between different transports and devices attached or connected via a wire to the transport's computer are also secured.

For example, the authorization module 293F may store passwords, usernames, PIN codes, biometric scans, and the like for different transport users. The authorization module 293F may determine whether a user (or technician) has permission to access certain settings such as a transport's computer. In some embodiments, the authorization module may communicate with a network interface to download any necessary authorization information from an external server. When a user desires to make changes to the transport settings or modify technical details of the transport via a console or GUI within the transport or via an attached/connected device, the authorization module 293F may require the user to verify themselves in some way before such settings are changed. For example, the authorization module 293F may require a username, a password, a PIN code, a biometric scan, a predefined line drawing or gesture, and the like. In response, the authorization module 293F may determine whether the user has the necessary permissions (access, etc.) being requested.

The authentication module 294F may be used to authenticate internal communications between ECUs on the CAN network of the vehicle. As an example, the authentication module 294F may provide information for authenticating communications between the ECUS. As an example, the authentication module 294F may transmit a bit signature algorithm to the ECUs of the CAN network. The ECUs may use the bit signature algorithm to insert authentication bits into the CAN fields of the CAN frame. All ECUs on the CAN network typically receive each CAN frame. The bit signature algorithm may dynamically change the position, amount, etc., of authentication bits each time a new CAN frame is generated by one of the ECUs. The authentication module 294F may also provide a list of ECUs that are exempt (safe list) and that do not need to use the authentication bits. The authentication module 294F may communicate with a remote server to retrieve updates to the bit signature algorithm and the like.

The encryption module 295F may store asymmetric key pairs to be used by the transport to communicate with other external user devices and transports. For example, the encryption module 295F may provide a private key to be used by the transport to encrypt/decrypt communications, while the corresponding public key may be provided to other user devices and transports to enable the other devices to decrypt/encrypt the communications. The encryption module 295F may communicate with a remote server to receive new keys, updates to keys, keys of new transports, users, etc., and the like. The encryption module 295F may also transmit any updates to a local private/public key pair to the remote server.

Figure 3A:
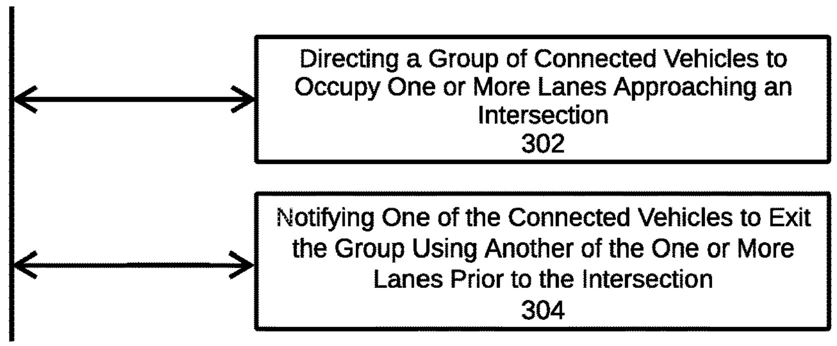
FIG. 3A illustrates a flow diagram, according to example embodiments.

FIG. 3A illustrates a flow diagram 300, according to example embodiments. Referring to FIG. 3A, the flow diagram 300 includes one or more of directing a group of connected vehicles to occupy one or more lanes approaching an intersection 302 and notifying one of the connected vehicles to exit the group using another of the one or more lanes prior to the intersection 304.

Figure 3B:
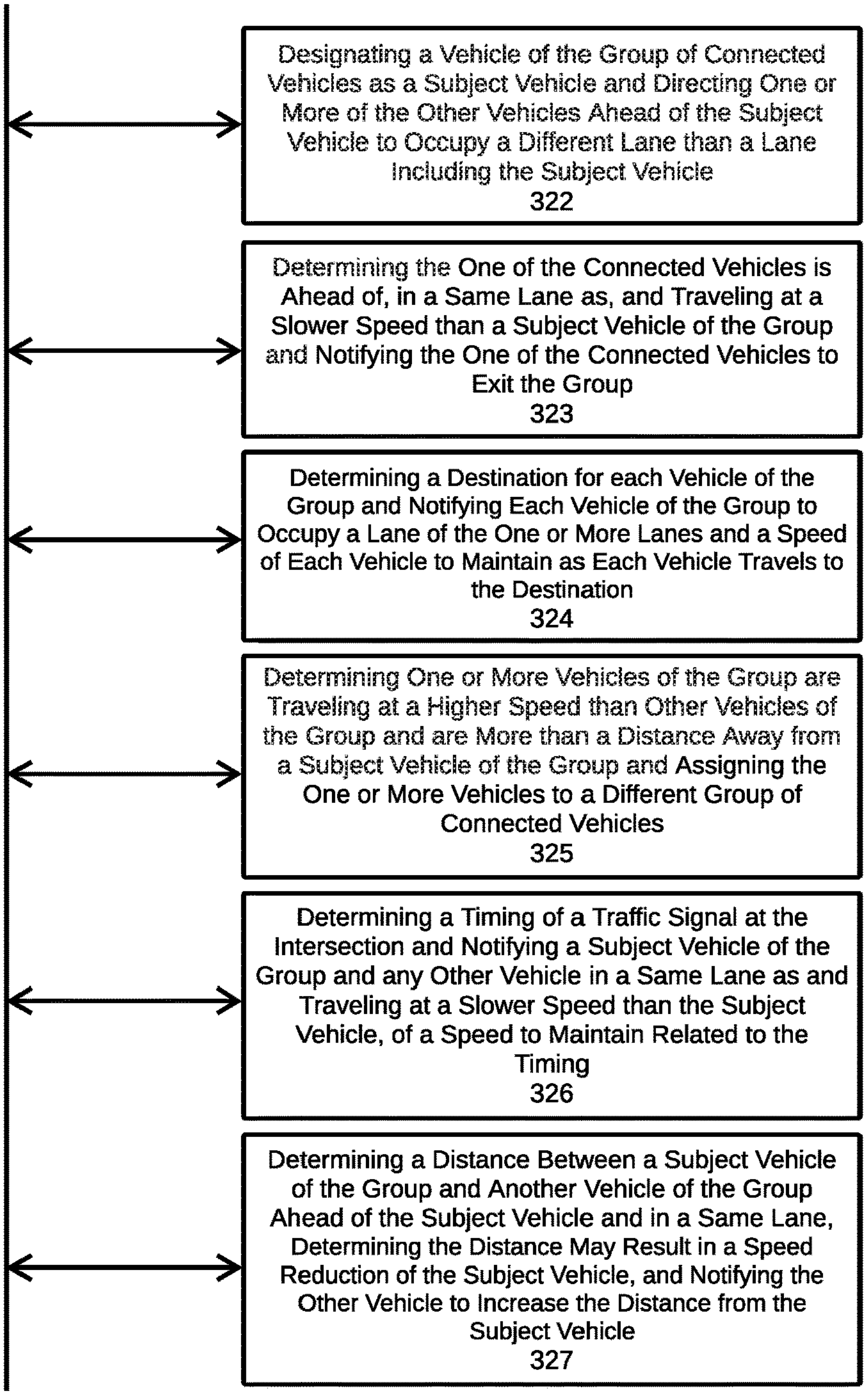
FIG. 3B illustrates another flow diagram, according to example embodiments.

FIG. 3B illustrates another flow diagram 320, according to example embodiments. Referring to FIG. 3B, the flow diagram 300 includes one or more of designating a vehicle of the group of connected vehicles as a subject vehicle 104 and directing one or more of the other vehicles 108 ahead of the subject vehicle 104 to occupy a different lane than a lane including the subject vehicle 104 322, determining the one of the connected vehicles is ahead of, in a same lane as, and traveling at a slower speed than a subject vehicle 104 of the group and notifying the one of the connected vehicles to exit the group 323, determining a destination for each vehicle of the group and notifying each vehicle of the group to occupy a lane of the one or more lanes and a speed of each vehicle to maintain as each vehicle travels to the destination 324, determining one or more vehicles of the group are traveling at a higher speed than other vehicles of the group and are more than a distance away from a subject vehicle 104 of the group and assigning the one or more vehicles to a different group of connected vehicles 325, determining a timing of a traffic signal at the intersection and notifying a subject vehicle 104 of the group and any other vehicle 108 in a same lane as and traveling at a slower speed than the subject vehicle 104, of a speed to maintain related to the timing 326, and determining a distance between a subject vehicle 104 of the group and another vehicle 108 of the group ahead of the subject vehicle 104 and in a same lane, determining the distance may result in a speed reduction of the subject vehicle 104, and notifying the other vehicle 108 to increase the distance from the subject vehicle 104 327.

Figure 3C:
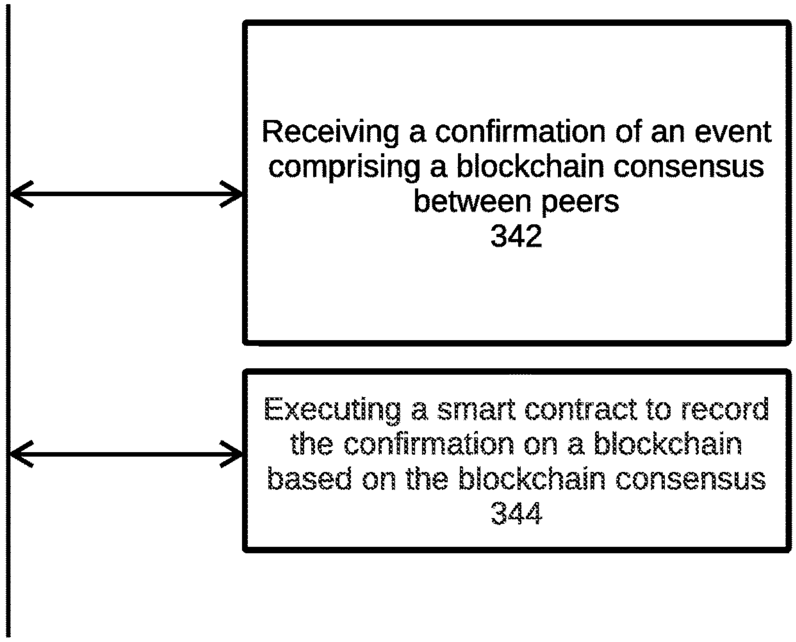
FIG. 3C illustrates yet another flow diagram, according to example embodiments.

FIG. 3C illustrates yet another flow diagram 340, according to example embodiments. Referring to FIG. 3C, the flow diagram includes one or more of receiving a confirmation of an event from one or more elements described or depicted herein, wherein the confirmation comprises a blockchain consensus between peers represented by any of the elements 342 and executing a smart contract to record the confirmation on a blockchain-based on the blockchain consensus 344.

Figure 4:
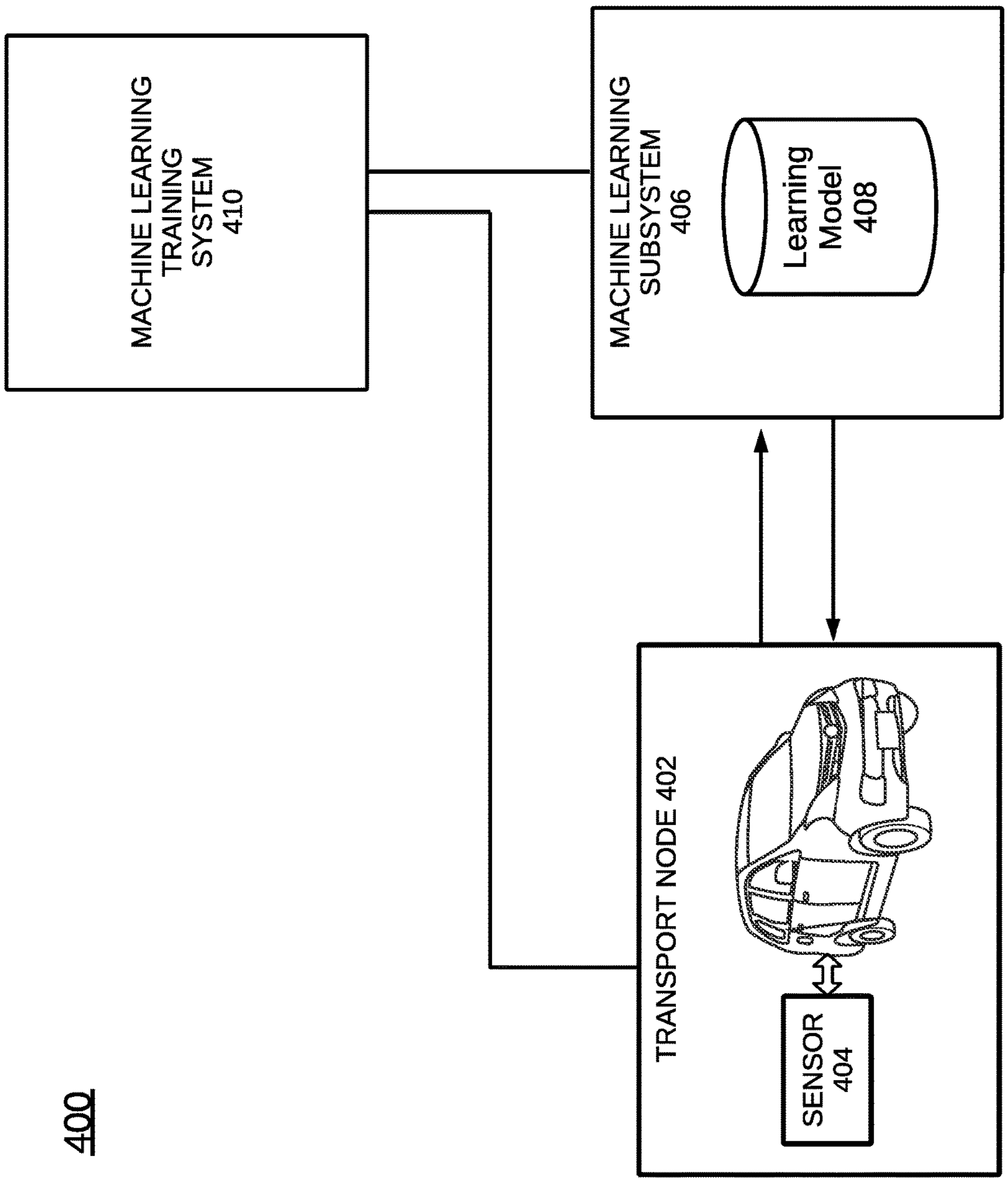
FIG. 4 illustrates a machine learning transport network diagram, according to example embodiments.

FIG. 4 illustrates a machine learning transport network diagram 400, according to example embodiments. The network 400 includes a transport 402 that interfaces with a machine learning subsystem 406. The transport includes one or more sensors 404.

The machine learning subsystem 406 contains a learning model 408, which is an artifact created by a machine learning training system 410 that generates predictions by finding patterns in one or more training data sets. In some embodiments, the machine learning subsystem 406 resides in the transport node 402. An artifact is used to describe an output created by a training process, such as a checkpoint, a file, or a model. In other embodiments, the machine learning subsystem 406 resides outside of the transport node 402.

The transport 402 sends data from the one or more sensors 404 to the machine learning subsystem 406. The machine learning subsystem 406 provides the one or more sensor 404 data to the learning model 408, which returns one or more predictions. The machine learning subsystem 406 sends one or more instructions to the transport 402 based on the predictions from the learning model 408.

In a further embodiment, the transport 402 may send the one or more sensor 404 data to the machine learning training system 410. In yet another example, the machine learning subsystem 406 may send the sensor 404 data to the machine learning subsystem 410. One or more of the applications, features, steps, solutions, etc., described and/or depicted herein may utilize the machine learning network 400 as described herein.

Figure 5A:
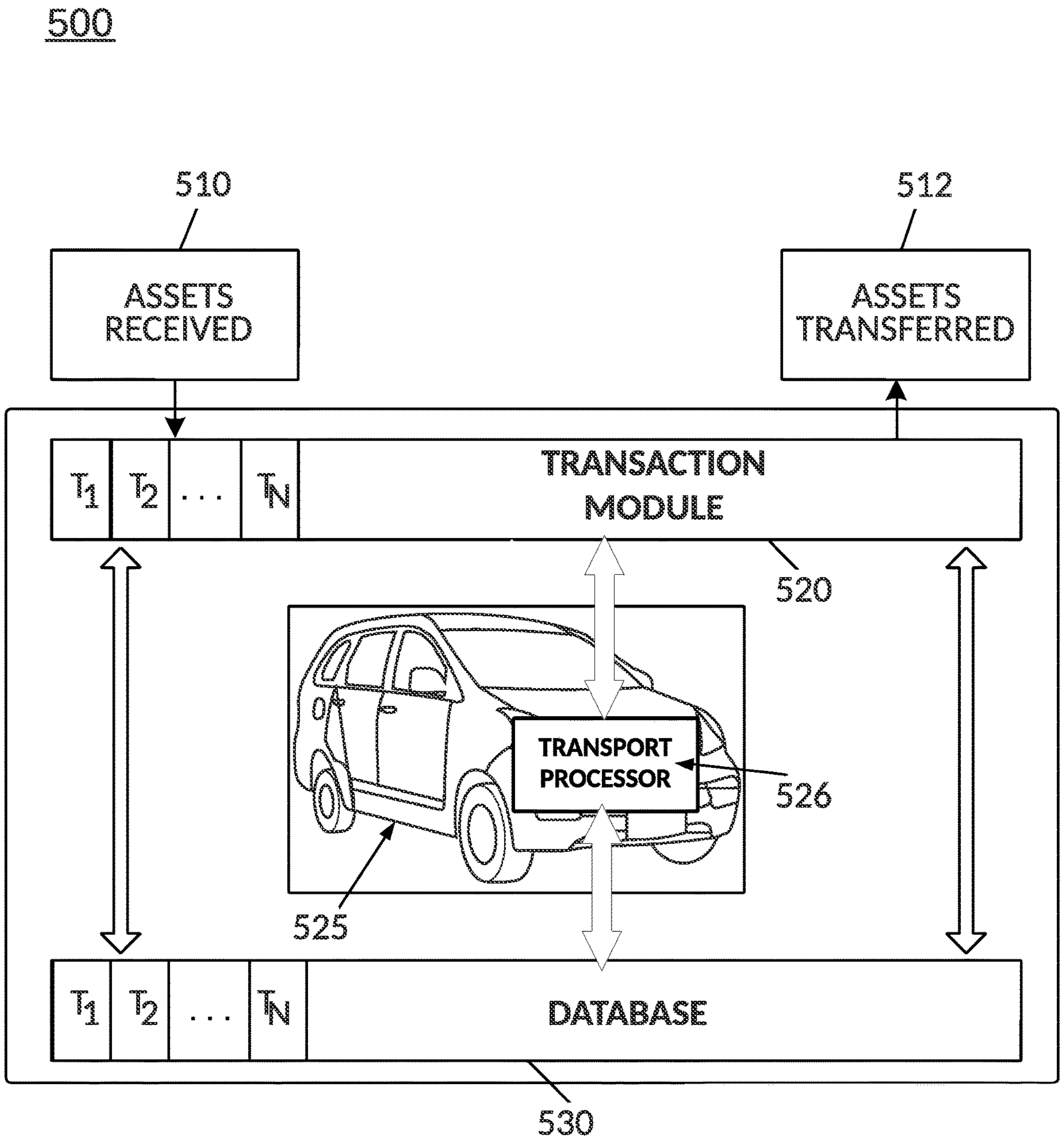
FIG. 5A illustrates an example vehicle configuration for managing database transactions associated with a vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., vehicle service, dealer transactions, delivery/pickup, transportation services, etc.), the vehicle may receive assets 510 and/or expel/transfer assets 512 according to a transaction(s). A transport processor 526 resides in the vehicle 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off-board the transport, may be accessed directly and/or through a network, or be accessible to the transport.

Figure 5B:
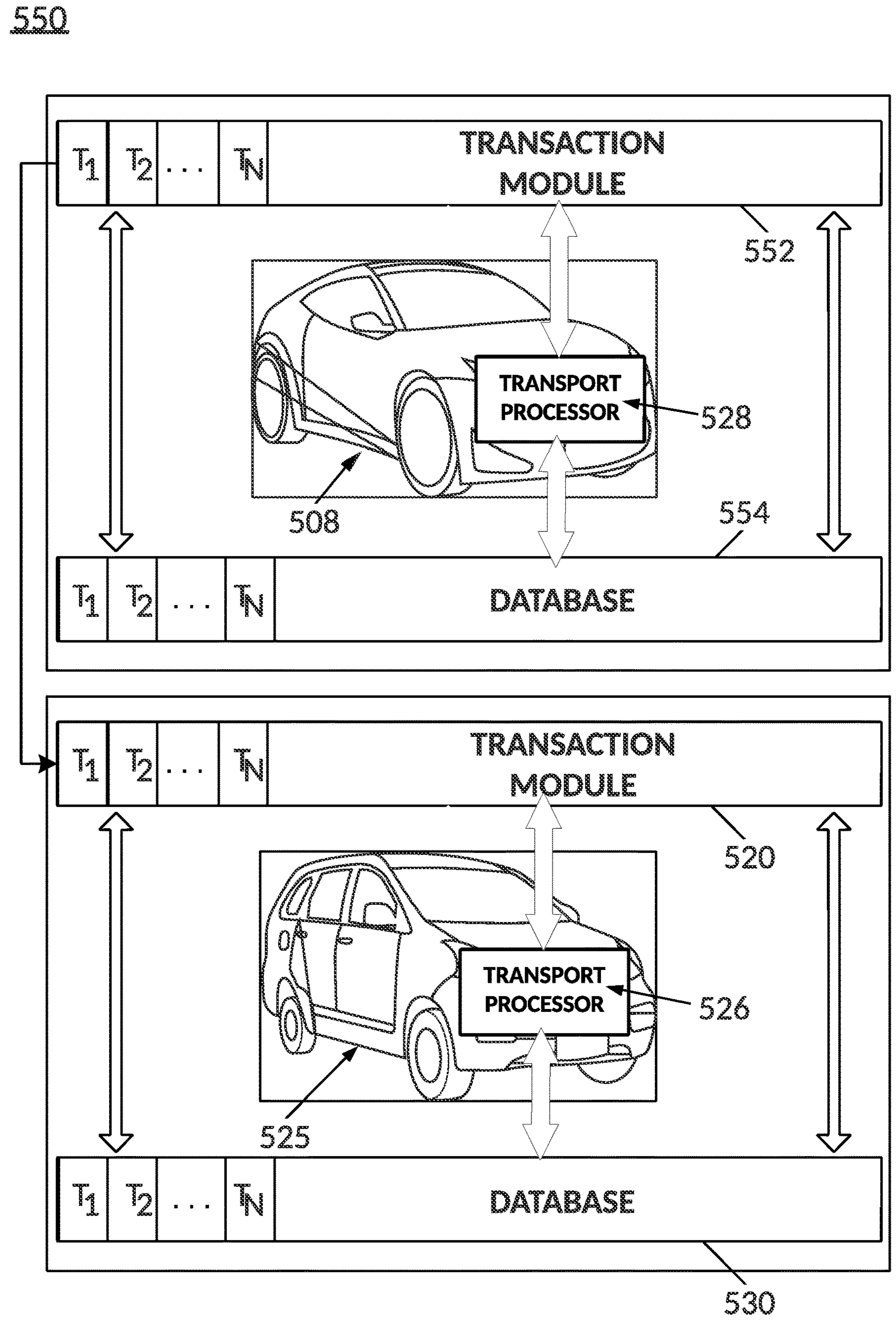
FIG. 5B illustrates another example vehicle configuration for managing database transactions conducted among various vehicles, according to example embodiments.

FIG. 5B illustrates an example vehicle configuration 550 for managing database transactions conducted among various vehicles, according to example embodiments. The vehicle 525 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. A transport processor 528 resides in the vehicle 508 and communication exists between the transport processor 528, a database 554, and the transaction module 552. The vehicle 508 may notify another vehicle 525, which is in its network and which operates on its blockchain member service. A transport processor 526 resides in the vehicle 525 and communication exists between the transport processor 526, a database 530, the transport processor 526 and a transaction module 520. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the database 530/554 assuming that the blockchains are different from one another, or are logged in the same blockchain used by all members. The database 554 can be one of a SQL database, an RDBMS, a relational database, a non-relational database, a blockchain, a distributed ledger, and may be on board the transport, may be off-board the transport, may be accessible directly and/or through a network.

Figure 6A:
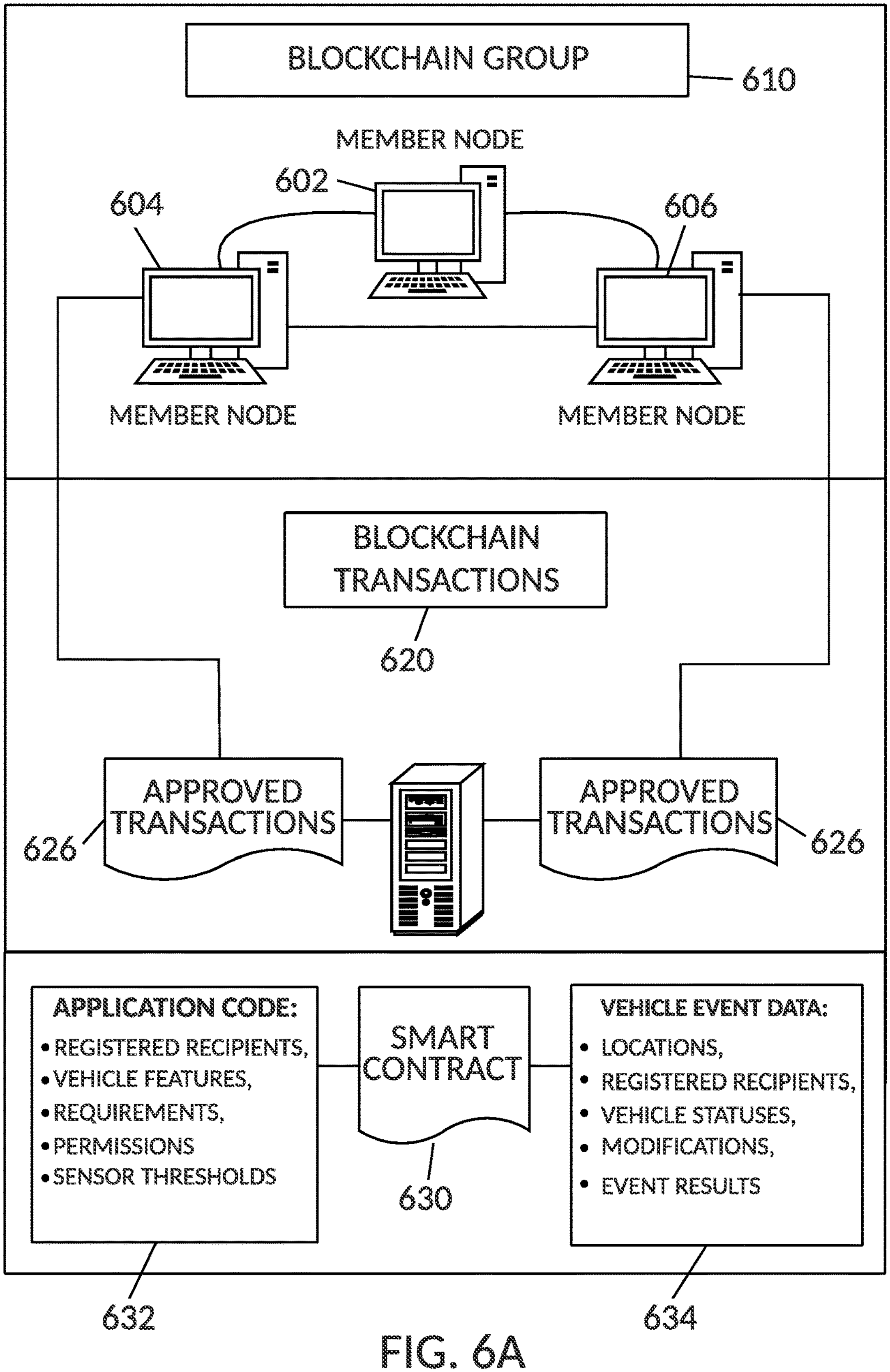
FIG. 6A illustrates a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes. Approved transactions 626 are stored in current blocks of the blockchain and committed to the blockchain via a committal procedure, which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 634, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 630, which are then stored in a blockchain. For example, sensor thresholds stored in the smart contract can be used as the basis for whether a detected service is necessary and when and where the service should be performed.

Figure 6B:
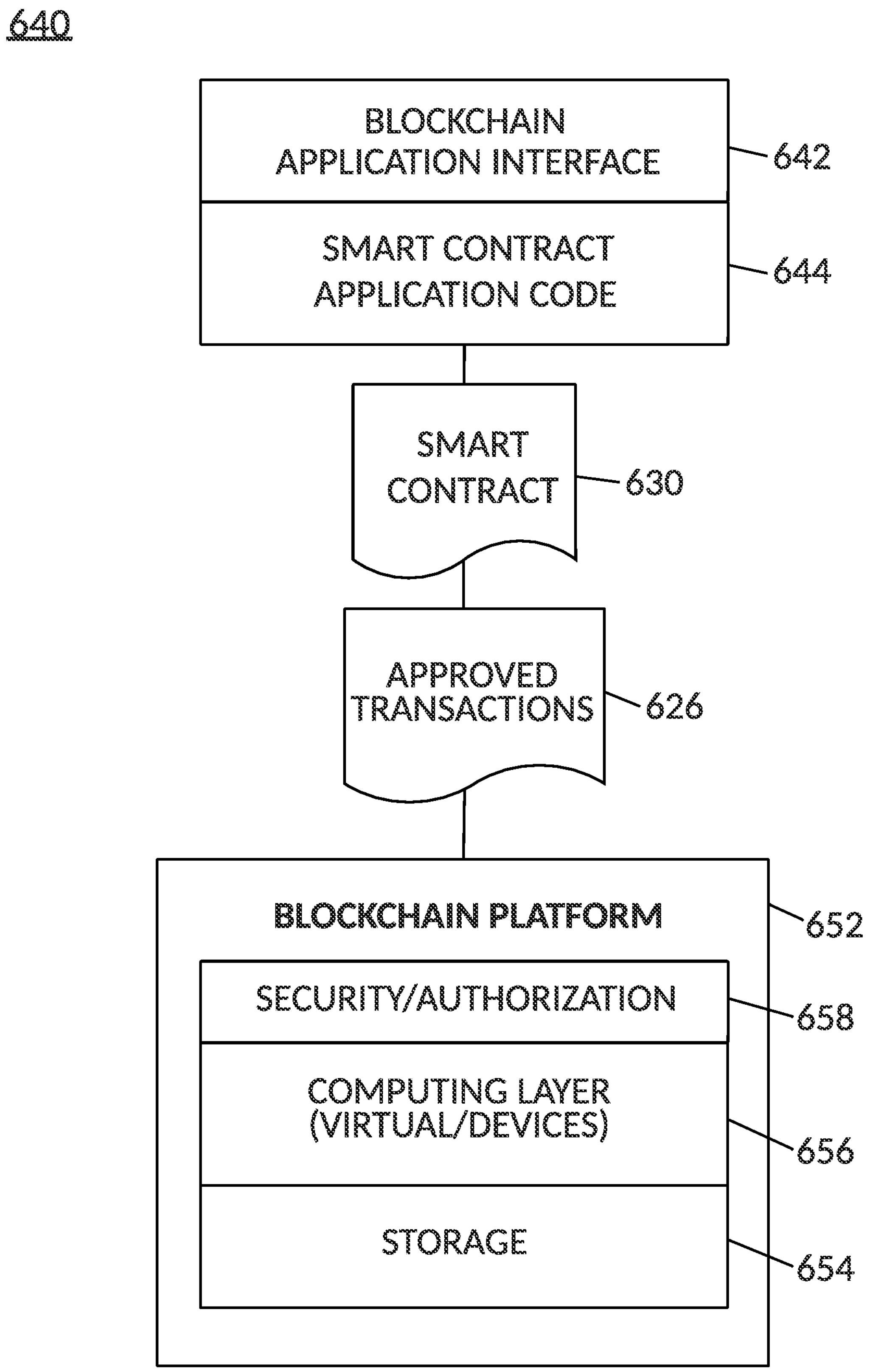
FIG. 6B illustrates another blockchain configuration, according to example embodiments.

FIG. 6B illustrates a shared ledger configuration, according to example embodiments. Referring to FIG. 6B, the blockchain logic example 640 includes a blockchain application interface 642 as an API or plug-in application that links to the computing device and execution platform for a particular transaction. The blockchain configuration 640 may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code, which when executed causes the transaction terms and conditions to become active. The smart contract 630, when executed, causes certain approved transactions 626 to be generated, which are then forwarded to the blockchain platform 652. The platform includes a security/authorization 658, computing devices, which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
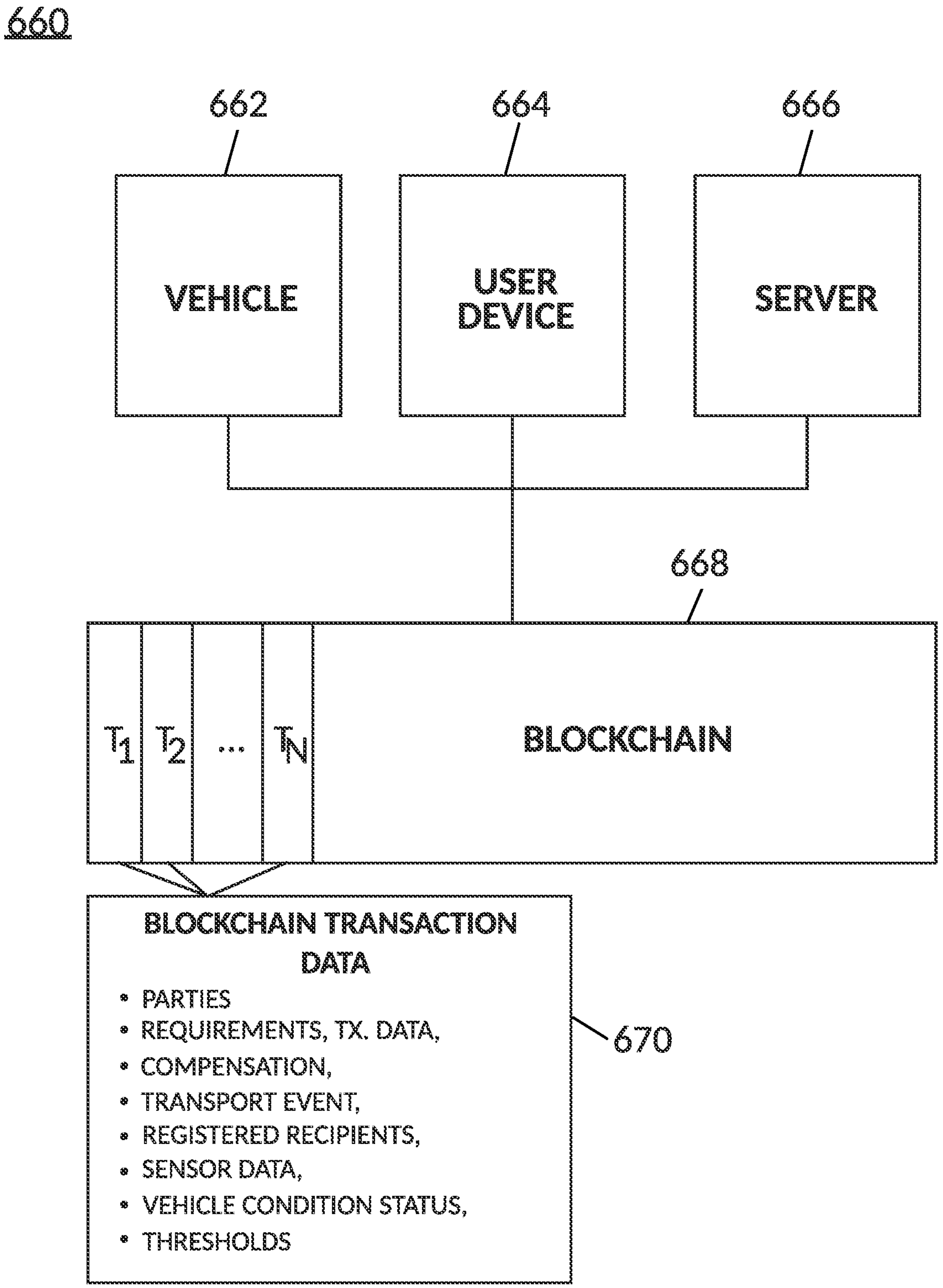
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662, the user device 664 and a server 666 sharing information with a distributed ledger (i.e., blockchain) 668. The server may represent a service provider entity inquiring with a vehicle service provider to share user profile rating information in the event that a known and established user profile is attempting to rent a vehicle with an established rated profile. The server 666 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 670 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 6D:
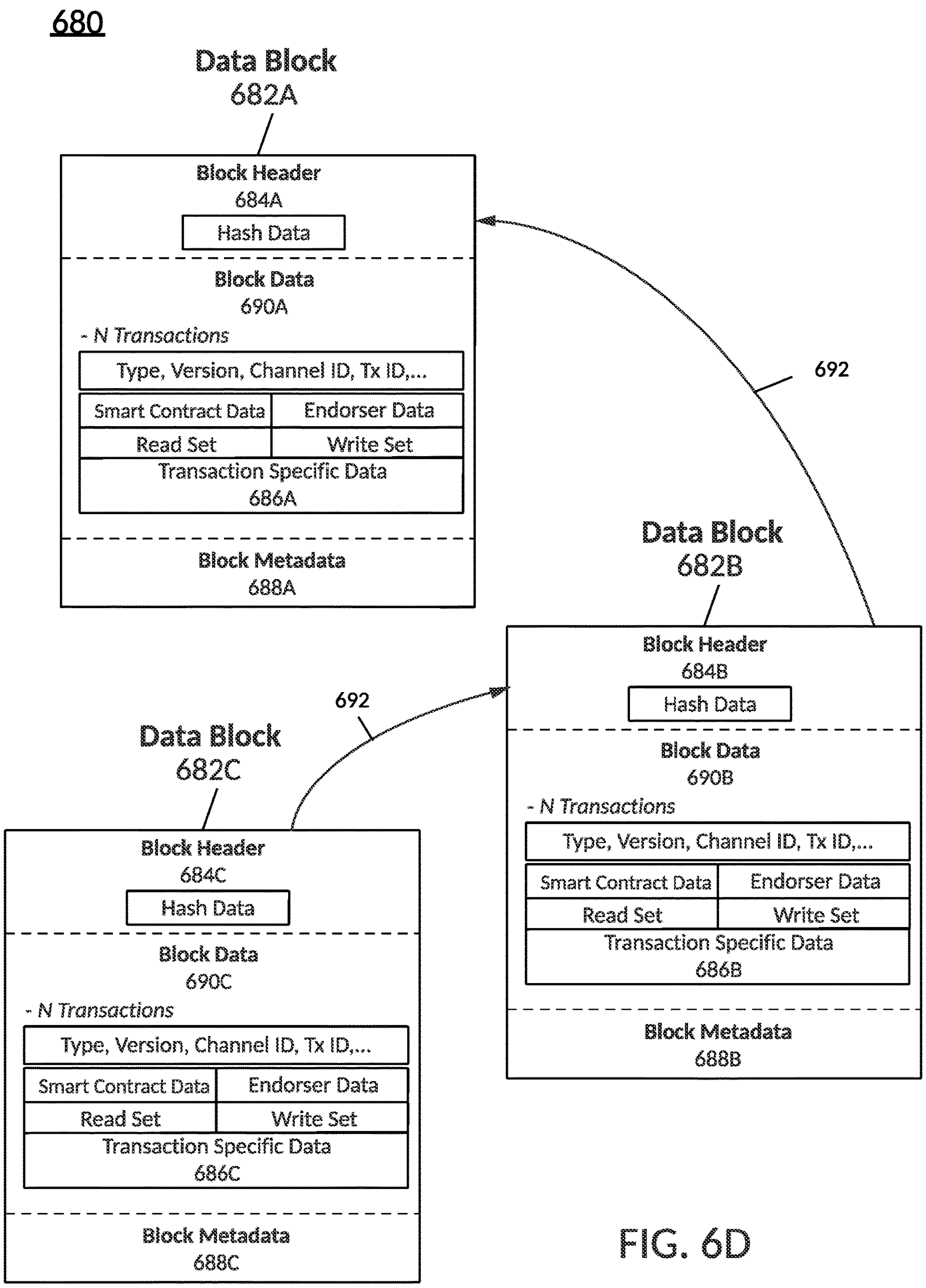
FIG. 6D illustrates example data blocks, according to example embodiments.

FIG. 6D illustrates blockchain blocks 680 that can be added to a distributed ledger, according to example embodiments, and contents of block structures 682A to 682*n*. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing nodes creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684*n*, transaction-specific data 686A to 686*n*, and block metadata 688A to 688*n*. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction-specific data 686A, which stores entry data; however, this is not a requirement. The block 682A may store transactional information of N entries (e.g., 100, 500, 1000, 2000, 3000, etc.) within the block data 690A to 690*n*. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block, which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction-specific data 686A, which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 610A and a validation code identifying whether an entry was valid/invalid.

The other blocks 682B to 682*n* in the blockchain also have headers, files, and values. However, unlike the first block 682A, each of the headers 684A to 684*n* in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
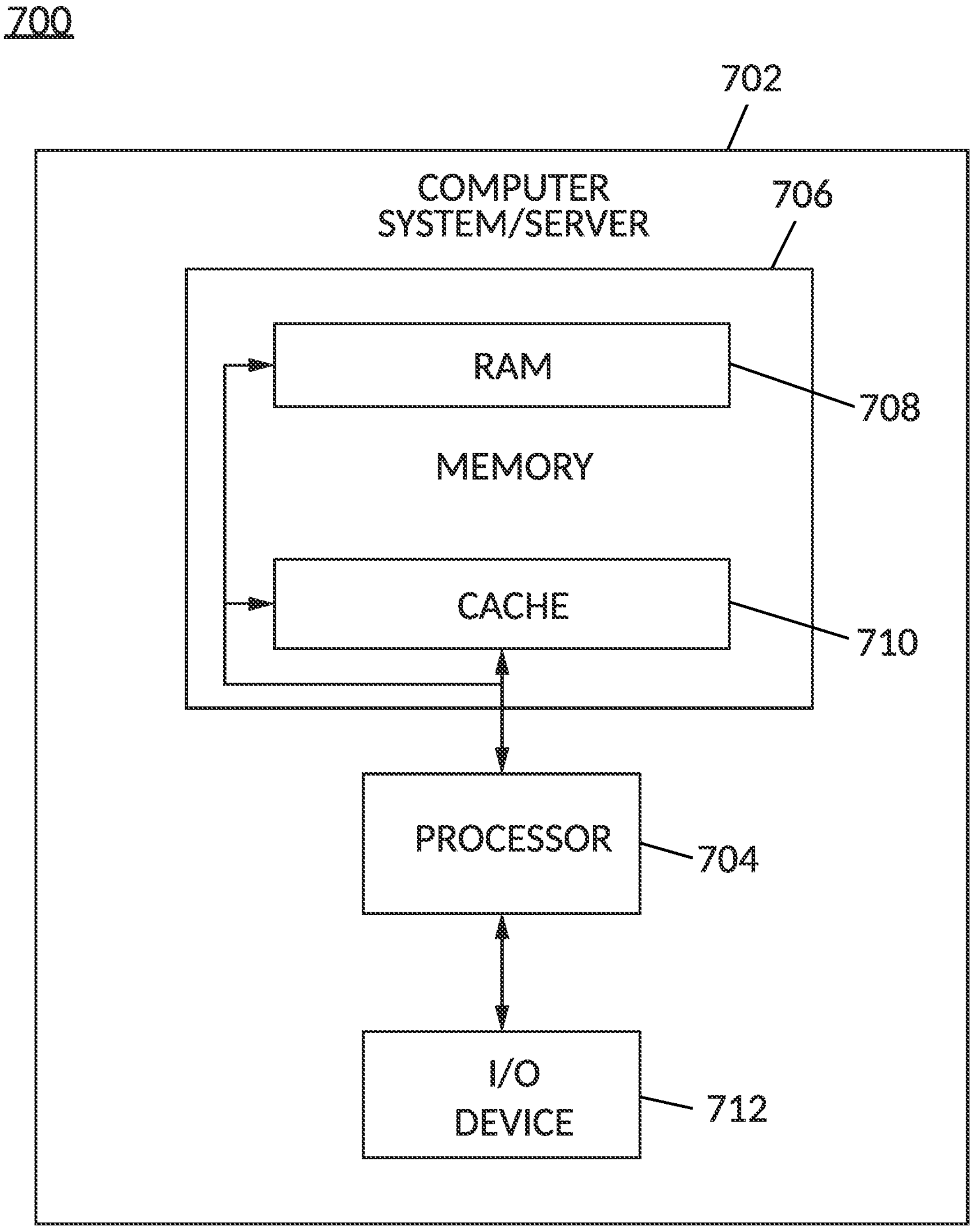
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one example, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field-programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:

directing a group of connected vehicles to occupy one or more lanes approaching an intersection;

determining a distance between a first vehicle and a second vehicle of the group of connected vehicles ahead of the first vehicle and in a same lane;

determining the distance results in a speed reduction of the first vehicle; and notifying the second vehicle to increase the distance from the first vehicle.

2. The method of claim 1, wherein directing the group of connected vehicles to occupy one or more lanes approaching the intersection comprises:

directing one or more other vehicles ahead of the first vehicle to occupy a different lane than a lane including the first vehicle.

3. The method of claim 1, comprising:

determining one of the connected vehicles is ahead of, in the same lane as, and traveling at a slower speed than the first vehicle of the group of connected vehicles; and notifying the one of the connected vehicles to exit the group of connected vehicles.

4. The method of claim 1, comprising:

determining a destination for each vehicle of the group of connected vehicles; and notifying each vehicle of the group of connected vehicles to occupy a lane of the one or more lanes and a speed of each vehicle to maintain as each vehicle travels to the destination.

5. The method of claim 1, comprising:

determining one or more vehicles of the group of connected vehicles are traveling at a higher speed than other vehicles of the group of connected vehicles and are more than a distance away from the first vehicle of the group of connected vehicles; and assigning the one or more vehicles to a different group of connected vehicles.

6. The method of claim 1, comprising:

determining a timing of a traffic signal at the intersection; and notifying the first vehicle of the group of connected vehicles and any other connected vehicle in the same lane as, and traveling at a slower speed than the first vehicle, of a speed to maintain related to the timing.

7. A system, comprising:

a processor; and a memory, coupled to the processor, comprising instructions that when executed by the processor are configured to:

direct a group of connected vehicles to occupy one or more lanes that approach an intersection;

determine a distance between a first vehicle of the group of connected vehicles and a second vehicle of the group of connected vehicles ahead of the first vehicle and in a same lane;

determine the distance results in a speed reduction of the first vehicle; and notify the second vehicle to increase the distance from the first vehicle.

8. The system of claim 7, wherein the processor directs the group of connected vehicles to occupy one or more lanes that approach the intersection comprises the instructions are configured to:

direct one or more other vehicles ahead of the first vehicle to occupy a different lane than a lane that includes the first vehicle.

9. The system of claim 7, wherein the instructions are configured to:

determine one of the connected vehicles is ahead of, in the same lane as, and travels at a slower speed than the first vehicle of the group of connected vehicles; and notify the one of the connected vehicles to exit the group of connected vehicles.

10. The system of claim 7, wherein the instructions are configured to:

determine a destination for each vehicle of the group of connected vehicles; and notify each vehicle of the group of connected vehicles to occupy a lane of the one or more lanes and a speed of each vehicle to maintain as each vehicle travels to the destination.

11. The system of claim 7, wherein the instructions are configured to:

determine one or more vehicles of the group of connected vehicles that travel at a higher speed than other vehicles of the group of connected vehicles and are more than a distance away from the first vehicle of the group of connected vehicles; and assign the one or more vehicles to a different group of connected vehicles.

12. The system of claim 7, wherein the instructions are configured to:

determine a timing of a traffic signal at the intersection; and notify the first vehicle of the group of connected vehicles and any other vehicle in the same lane as, and travels at a slower speed than the first vehicle, of a speed to maintain related to the timing.

13. A computer readable storage medium comprising instructions, that when read by a processor, cause the processor to perform:

directing a group of connected vehicles to occupy one or more lanes approaching an intersection;

determining a distance between a first vehicle and a second vehicle of the group of connected vehicles ahead of the first vehicle and in a same lane;

determining the distance results in a speed reduction of the first vehicle; and notifying the second vehicle to increase the distance from the first vehicle.

14. The computer readable storage medium of claim 13, wherein directing the group of connected vehicles to occupy one or more lanes approaching the intersection comprises the instructions cause the processor to perform:

directing one or more other vehicles ahead of the first vehicle to occupy a different lane than a lane including the first vehicle.

15. The computer readable storage medium of claim 13, wherein the instructions cause the processor to perform:

determining one of the connected vehicles is ahead of, in the same lane as, and traveling at a slower speed than the first vehicle of the group of connected vehicles; and notifying the one of the connected vehicles to exit the group of connected vehicles.

16. The computer readable storage medium of claim 13, wherein the instructions cause the processor to perform:

determining a destination for each vehicle of the group of connected vehicles; and notifying each vehicle of the group of connected vehicles to occupy a lane of the one or more lanes and a speed of each vehicle to maintain as each vehicle travels to the destination.

17. The computer readable storage medium of claim 13, wherein the instructions cause the processor to perform:

determining one or more vehicles of the group of connected vehicles are traveling at a higher speed than other vehicles of the group of connected vehicles and are more than a distance away from the first vehicle of the group of connected vehicles; and assigning the one or more vehicles to a different group of connected vehicles.

18. The computer readable storage medium of claim 13, wherein the instructions cause the processor to perform:

determining a timing of a traffic signal at the intersection; and notifying the vehicle of the group of connected vehicles and any other vehicle in the same lane as, and traveling at a slower speed than the first vehicle, of a speed to maintain related to the timing.

* * * * *